(12) United States Patent
You

(10) Patent No.: US 10,759,422 B2
(45) Date of Patent: *Sep. 1, 2020

(54) DEVICE FOR CONTROLLING VEHICLE AT INTERSECTION

(71) Applicant: MANDO CORPORATION, Pyeongtaek-Si (KR)

(72) Inventor: Kwan Sun You, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,908

(22) Filed: Dec. 13, 2018

(65) Prior Publication Data

US 2019/0126920 A1    May 2, 2019

Related U.S. Application Data

(63) Continuation of application No. 15/719,550, filed on Sep. 29, 2017.

(30) Foreign Application Priority Data

Oct. 11, 2016 (KR) .......................... 10-2016-0131523

(51) Int. Cl.
*B60W 30/095* (2012.01)
*G01S 13/72* (2006.01)
(Continued)

(52) U.S. Cl.
CPC ......... *B60W 30/0956* (2013.01); *B60Q 9/008* (2013.01); *B60W 30/09* (2013.01);
(Continued)

(58) Field of Classification Search
CPC ............. B60W 30/0956; B60W 30/09; B60W 30/0953; B60W 30/18154;
(Continued)

(56) References Cited

U.S. PATENT DOCUMENTS 9,248,834 B1 *  2/2016  Ferguson .............. B60W 30/09
9,718,405 B1 *  8/2017  Englander ............... G01S 19/13
(Continued)

FOREIGN PATENT DOCUMENTS

CN    102971175 A     3/2013
JP    2009-074803 A   4/2009
(Continued)

OTHER PUBLICATIONS

Office Action issued in related U.S. Appl. No. 15/719,550, dated Apr. 29, 2019.
(Continued)

*Primary Examiner* — Anne Marie Antonucci
(74) *Attorney, Agent, or Firm* — Morgan, Lewis & Bockius LLP

(57) ABSTRACT

A device for controlling a vehicle at an intersection. The device variably sets a monitoring range of a vehicle sensor in accordance with a relationship between the progress paths of a host vehicle and a target vehicle at an intersection, or controls the host vehicle according to a collision avoidance control method in comparison with a predetermined scenario of a collision possibility of the host vehicle and the target vehicle at the intersection according to a scenario, thereby making it possible to prevent a collision at the intersection.

21 Claims, 28 Drawing Sheets

(51) Int. Cl.
  *B60Q 9/00* (2006.01)
  *G08G 1/16* (2006.01)
  *G01S 13/93* (2020.01)
  *B60W 30/09* (2012.01)
  *B60W 30/18* (2012.01)
  *G01S 13/931* (2020.01)
  *B60W 50/14* (2020.01)

(52) U.S. Cl.
  CPC .. *B60W 30/0953* (2013.01); *B60W 30/18154* (2013.01); *G01S 13/726* (2013.01); *G01S 13/931* (2013.01); *G08G 1/166* (2013.01); *B60W 2050/143* (2013.01); *B60W 2050/146* (2013.01); *B60W 2420/42* (2013.01); *B60W 2420/52* (2013.01); *B60W 2510/1005* (2013.01); *B60W 2510/20* (2013.01); *B60W 2520/10* (2013.01); *B60W 2520/12* (2013.01); *B60W 2520/14* (2013.01); *B60W 2540/16* (2013.01); *B60W 2540/18* (2013.01); *B60W 2540/20* (2013.01); *B60W 2554/00* (2020.02); *B60W 2554/80* (2020.02); *B60W 2720/106* (2013.01); *B60Y 2400/3015* (2013.01); *B60Y 2400/3017* (2013.01); *G01S 2013/93271* (2020.01); *G01S 2013/93274* (2020.01)

(58) Field of Classification Search
  CPC ......... B60W 250/143; B60W 250/146; B60W 2420/42; B60W 2420/52; B60W 2510/20; B60W 2540/16; B60W 2540/18; B60W 2540/20; B60W 2520/10; B60W 2520/12; B60W 2520/14; B60W 2520/16; B60W 2550/10; B60W 2550/30; B60W 2720/106; B60Q 9/008; G01S 13/726; G01S 13/931; G01S 2013/9375; G01S 2013/9385; G08G 1/166; B60Y 2400/3015; B60Y 2400/3017
  USPC ......................................................... 701/301
  See application file for complete search history.

(56) References Cited

U.S. PATENT DOCUMENTS

| | | | |
|---|---|---|---|
| 10,196,058 B2* | 2/2019 | Paris | B60W 30/0956 |
| 10,229,598 B1* | 3/2019 | Doig | G08B 21/02 |
| 2003/0016143 A1 | 1/2003 | Ghazarian | |
| 2005/0033516 A1* | 2/2005 | Kawasaki | B60R 21/013 701/301 |
| 2008/0049106 A1* | 2/2008 | Kallhammer | B60R 1/00 348/164 |
| 2009/0143986 A1* | 6/2009 | Stein | G08G 1/16 701/301 |
| 2010/0100324 A1* | 4/2010 | Caminiti | G08G 1/0104 701/301 |
| 2012/0154591 A1* | 6/2012 | Baur | B60R 1/00 348/148 |
| 2012/0235805 A1* | 9/2012 | Nogami | G06T 7/215 340/441 |
| 2012/0314074 A1* | 12/2012 | Aimura | G06K 9/00362 348/148 |
| 2013/0253754 A1* | 9/2013 | Ferguson | G05D 1/0231 701/28 |
| 2013/0308828 A1 | 11/2013 | Stein et al. | |
| 2014/0002651 A1* | 1/2014 | Plante | H04N 5/76 348/148 |
| 2014/0148999 A1* | 5/2014 | Goudy | G08G 1/163 701/41 |
| 2015/0124096 A1* | 5/2015 | Koravadi | G06K 9/00825 348/148 |
| 2016/0140847 A1* | 5/2016 | Kawamata | G08G 1/163 701/36 |
| 2016/0167579 A1 | 6/2016 | Hwang et al. | |
| 2017/0113683 A1* | 4/2017 | Mudalige | B60W 30/08 |
| 2018/0122245 A1* | 5/2018 | Penilla | G05D 1/0011 |
| 2018/0211536 A1* | 7/2018 | Akamine | B60W 30/09 |
| 2019/0012919 A1* | 1/2019 | Brandriff | B60R 21/01 |
| 2019/0080607 A1* | 3/2019 | McClain | G08G 1/0116 |

FOREIGN PATENT DOCUMENTS

| | | |
|---|---|---|
| JP | 2013-250781 A | 12/2013 |
| KR | 10-2011-0132437 A | 12/2011 |
| KR | 10-1190835 B1 | 10/2012 |
| WO | 2013/062274 A1 | 5/2013 |

OTHER PUBLICATIONS

U.S. Office Action issued in corresponding U.S. Appl. No. 15/719,550, dated Oct. 8, 2019.

Chinese Office Action dated Nov. 5, 2019 issued in Chinese Patent Application No. 201710942640.8.

* cited by examiner

DEVICE FOR CONTROLLING VEHICLE AT INTERSECTION

CROSS REFERENCE TO RELATED APPLICATION

This application is a continuation of U.S. application Ser. No. 15/719,550, filed Sep. 29, 2017, which claims priority from Korean Patent Application No. 10-2016-0131523, filed on Oct. 11, 2016, the entire disclosures of which are hereby incorporated herein by reference.

BACKGROUND

1. Field

The present disclosure relates to a device for controlling a vehicle at an intersection (hereinafter, which may also be simply referred to as a "vehicle control device" for the convenience of description). The present disclosure relates to a technique for variably setting an interest area of a vehicle sensor at an intersection, or determining a possibility of collision between a host vehicle and an object at an intersection and controlling the vehicle according to a determination result.

2. Description of the Related Art

Recently, vehicles are provided with the functions of autonomously determining the possibility of collision with an object that is not recognized by a driver, and providing an alarm to the driver depending on the determination result.

Such a collision alarm device senses the position of the object using a radar sensor, calculates a collision risk depending on the proximity between the sensed object and the host vehicle, and provides an alarm to the driver depending on the collision risk.

However, there is a case in which the possibility of collision between an object and a vehicle is relatively very low even though the object is close to the vehicle. For example, when a vehicle enters an intersection in a direction opposite the running direction of the host vehicle at the intersection, the possibility of collision is very low, even though the vehicle is approaching the host vehicle. A conventional collision alarm device provides an alarm to the driver in such a case as well, which reduces the driver's confidence in the alarm.

On the other hand, there is a case in which the possibility of collision between an object and the host vehicle is relatively very high, even though the object is located at a long distance from the host vehicle. For example, when a vehicle enters an intersection in a direction intersecting the running direction of the host vehicle at the intersection, the possibility of collision between the object and the host vehicle is very high, even if the object is located at a long distance from the vehicle at the present time. However, the conventional collision alarm device does not provide an alarm in this case.

Thus, the conventional collision alarm device may provide or may not provide an alarm even though the collision alarm device does not appropriately determine the possibility of collision between an object and the host vehicle.

SUMMARY OF THE DISCLOSURE

As such, in an aspect, the present disclosure provides a technique for predicting a progress path of an object in an intersection area through a progress path scenario and determining a possibility of collision between the object and the vehicle according to the predicted progress path. In another aspect, the present disclosure provides a technique for performing, when a plurality of objects are sensed, collision avoidance control with respect to an object having a high possibility of collision.

Further, the present disclosure provides a technique for improving target vehicle-sensing performance for sensing a target vehicle in an intersection area by setting an interest region of a vehicle sensor in accordance with the running path of the host vehicle and the running path of the target vehicle in the intersection area.

In order to achieve the above-described objects, there is provided a vehicle control device for use in an intersection area. The vehicle control device includes: a sensing unit configured to sense a position of an object in an intersection area; a tracker configured to track a progress path in an intersection area of a plurality of objects based on the sensed position; a scenario device configured to apply at least one progress path scenario among a plurality of progress path scenarios previously stored for each of the plurality of objects based on a progress path in the intersection area for the plurality of tracked objects; and a controller configured to determine a possibility of collision between the plurality of objects and a host vehicle in the intersection area according to the applied progress path scenario, and to display determined information about the possibility of collision or to control the vehicle according to the determined information.

In another aspect, the present disclosure provides a vehicle control device for use in an intersection area. The vehicle control device includes: a vehicle information sensing unit configured to sense vehicle information which is at least one of a vehicle speed, a gear position, a yaw rate, a steering angle, or a turn signal lamp; a host vehicle path determination unit configured to determine a path of a host vehicle in the intersection area based on the vehicle information; a target vehicle sensing unit configured to sense a target vehicle based on external information which is at least one of: camera image information acquired from a camera configured to monitor the front side; first radar information acquired from a a front radar configured to monitor the front side; and second radar information acquired from a corner radar configured to monitor both sides; a target vehicle path determination unit configured to determine the path of the target vehicle in the intersection area based on the external information; a setter configured to set a region of interest ("monitoring range") of one of the camera image information, the first radar information, and the second radar information based on the path of the host vehicle and the path of the target vehicle in the intersection area; a calculator configured to calculate a speed of a vehicle of interest that is a target vehicle positioned in the region of interest based on the external information and to calculate a Time-To-Collision (TTC) with the vehicle of interest; and a controller configured to control a notification device or a control device based on the TTC with the vehicle of interest.

As described above, according to one embodiment of the present disclosure, it is possible to predict a progress path of an object through a progress path scenario and to determine a possibility of collision between the object and the host vehicle according to the predicted path, so that the reliability of determination can be enhanced as compared with the conventional technique of determining a possibility of collision based merely on a proximity degree between the object and the host vehicle. In addition, according to the present disclosure, when a plurality of objects are sensed, an object having a high possibility of collision may be determined, and collision avoidance control may be appropriately performed with respect to the object having a high possibility of collision.

According to another embodiment of the present disclosure, it is possible to improve the performance of sensing target vehicles, and as a result, to reduce the likelihood of an accident at the intersection by variably setting a region of interest of a sensing sensor of the host vehicle according to the relationship between the progress paths of the host vehicle and target vehicles at an intersection.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
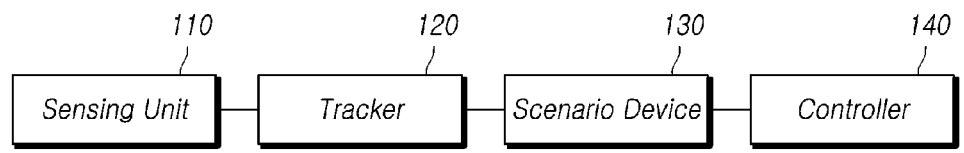
FIG. 1 is a diagram illustrating the configuration of a vehicle control device according to a first exemplary embodiment.

Hereinafter, exemplary embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted for brevity and when it is determined that the description may make the subject matter of the present disclosure unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, or the first component may be directly connected, coupled or joined to the second component.

FIG. 1 is a diagram illustrating the configuration of a vehicle control device according to a first exemplary embodiment.

Referring to FIG. 1, a vehicle control device 100 for controlling a vehicle in an intersection area (hereinafter, simply referred to as a "vehicle control device") may include a sensing unit 110, a tracker 120, a scenario device 130, and a controller 140 (e.g., processor, computer, etc.).

The sensing unit 110 may sense the position of an object, and the tracker 120 may track the progress paths of the plurality of objects based on the sensed position. The scenario device 130 may apply at least one progress path scenario among a plurality of progress path scenarios previously stored for each of the plurality of objects based on the tracked progress path. The controller 140 may determine a possibility of collision between the plurality of objects and the host vehicle according to the applied route scenario, display the determination information on the possibility of collision on the display device, or control the host vehicle according to the determination information.

In more detail, the sensing unit 110 may sense the positions of the objects. An object may be a vehicle, a pedestrian, another obstacle, etc.

The sensing unit 110 may include various kinds of sensors or object sensing devices in order to sense an object. For example, the sensing unit 110 may include various types of sensors or object sensing devices such as a radar sensor and an image sensor. The image sensor may be a Light Detection And Ranging (LiDAR) sensor or a camera device.

In addition, the sensing unit 110 may include a plurality of sensors or object sensing devices. For example, the sensing unit 110 may include a front radar sensor in the front direction with respect to the radar sensor, corner radar sensors which are respectively installed at both front corners of the vehicle in order to sense lateral directions, and a rear radar sensor. With respect to the radar sensors, the sensing unit 110 may include a radar sensor that senses a relatively short distance to the radar sensor, a radar sensor that senses a relatively medium distance, and a radar sensor that senses a relatively long distance.

In particular, the sensing unit 110 according to the present embodiment may have a camera device, a front radar, and a corner radar, and the front radar may include a Long-Range Radar (LRR) having a narrow-angle and long sensing range, and may include a Short-Range Radar (SRR) having a wide-angle and short sensing range.

At this time, the corner radar has a sensing angle of about 120 degrees, the short-range radar of the front radar has a sensing angle of about 90 degrees, and the camera has a sensing angle of about 50 degrees.

Therefore, as described below, the tracker in the present exemplary embodiment may perform tracking for the objects by sequentially using information sensed by the corner radar sensor, information sensed by the front radar sensor, and information sensed by the camera device.

Figure 2:
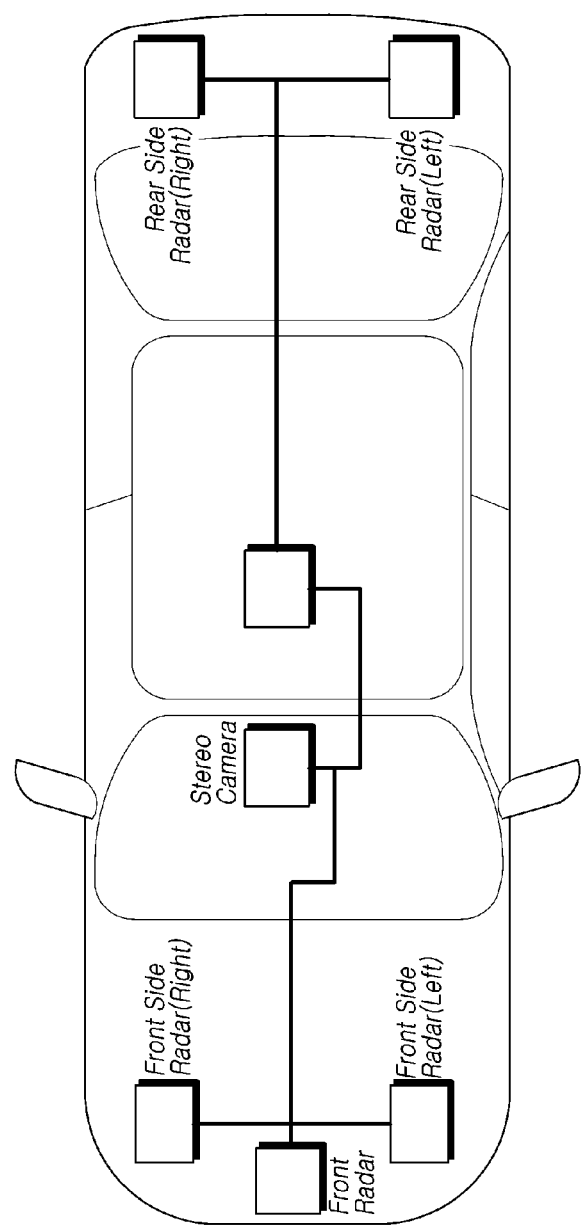
FIG. 2 is a diagram illustrating a vehicle in which a plurality of sensors or object sensing devices are arranged in the first embodiment.

FIG. 2 illustrates a vehicle in which a plurality of sensors or object sensing devices are arranged in the first embodiment.

As illustrated in FIG. 2, radar sensors may be disposed on the front, side, and rear surfaces of the vehicle, and a stereo camera device may be disposed in the front direction. The sensing unit 110 described with reference to FIG. 1 may include the radar sensors or the camera device.

The sensors or object sensing devices (e.g., a camera device) included in the sensing unit 110 may have different object-sensing regions depending on the types or arrangements thereof. For example, the radar sensors may have a relatively long sensing area in the longitudinal direction, but a relatively narrow sensing area in the lateral direction. On the other hand, the camera devices may have a relatively narrow sensing area in the longitudinal direction and a relatively wide sensing area in the lateral direction.

The sensing unit 110 includes a plurality of sensors or object sensing devices, and is capable of sensing the objects in a complementary manner for the overlapping sensing regions of the sensors or object sensing devices.

For example, the sensing unit 110 may include a radar sensor and a camera device. For an overlapping sensing region of the radar sensor and the camera device, the position data sensed by one of the radar sensor and the camera device may be used to correct the position data sensed by the other one of the radar sensor and the camera device.

Figure 3:
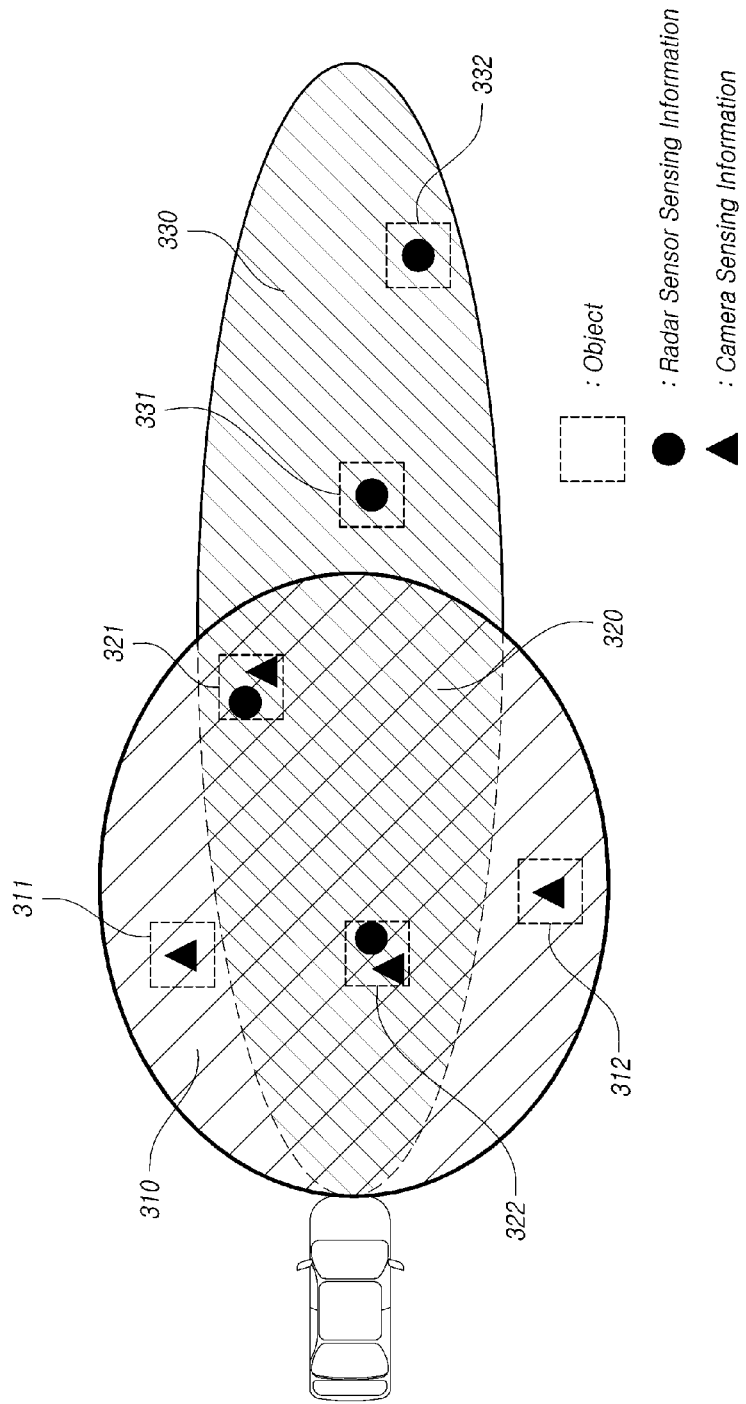
FIG. 3 is a diagram illustrating how a sensing unit according to the first embodiment senses an object using a radar sensor and a camera device.

FIG. 3 is a diagram illustrating how the sensing unit senses an object using a radar sensor and a camera device.

Referring to FIG. 3, the sensing unit 110 may sense an object in a longitudinal direction using the radar sensor. In addition, the sensing unit 110 is capable of widely sensing an object in a lateral direction using the camera device.

Specifically, the sensing unit 110 may sense a plurality of objects 311, 312, 321, and 322 in a first sensing region 310, which extends in the lateral direction. In addition, the sensing unit 110 may sense a plurality of objects 321, 322, 331, and 332 in a third sensing region 330, which extends in the longitudinal direction.

At this time, the sensing unit 110 may sense a plurality of objects 321 and 322 in the second sensing region 320 overlapping in the first sensing region 310 and the third sensing region 330 using both the radar sensor and the camera device. In addition, the sensing unit 110 may correct, using the position data of the objects 321 and 322 sensed by one device (e.g., a radar sensor) in the overlapping sensing region 320, the position data of the objects 321 and 322 sensed by another device (e.g., the camera device). In general, since the radar sensor is capable of accurately sensing the movement in the longitudinal direction and the camera device is capable of accurately sensing the movement in the lateral direction, the sensing unit 110 may use the position data measured by the radar sensor for the movement or the position in the longitudinal direction, and the position data measured by the camera device for the movement or position in the lateral direction.

FIG. 3 exemplifies a case in which the sensing unit 110 uses a radar sensor and a camera device in a complementary manner. However, the sensing unit 110 may use the other sensors in a complementary manner. For example, the sensing unit 110 may include a plurality of radar sensors having different sensing regions, and for an overlapping sensing region of the radar sensors, position data sensed by one radar sensor may be used in order to correct position data sensed by another radar sensor.

The sensing unit 110 may divide the sensing region into a plurality of regions and may include a plurality of sensors (e.g., radar sensors, camera devices, and the like) that sense the regions, respectively. For example, the sensing unit 110 may include a radar sensor that senses a left region of the vehicle, a radar sensor that senses a right region of the vehicle, a radar sensor that senses a remote front region of the vehicle, and a camera device that senses a front region of the vehicle, and the like.

The plurality of sensors sense objects around a specific sensing region, but some regions may overlap each other. For example, the sensing region of the radar sensor that senses the left area and the sensing region of the camera device that senses the front region may overlap.

When using the plurality of sensors, the sensing unit 110 may have a wider sensing region compared to a case where the sensing unit 110 uses only one sensor, and sensing accuracy may also be improved through the complement of the sensors in an overlapping region.

The sensing unit 110 may continuously or intermittently sense the positions of objects and may continuously or intermittently generate the position data for each of the objects. Such position data may have both time values and coordinate values.

The tracker 120 may track the progress path for a plurality of objects using the position data.

The tracker 120 may receive the position data including the time values and the coordinate values from the sensing unit 110, and may track the progress paths of the objects by connecting the objects positioned close to each other continuously.

At this time, since it is necessary for the tracker 120 to sense/track target vehicles from the information of the three sensors (the corner radar, the front radar, and the camera) in the intersection area, it is possible to track objects by sequentially using the information sensed by the corner radar sensor having the largest sensing angle, the information sensed by the front radar sensor having a middle sensing angle, and the information sensed by the camera device having the smallest sensing angle.

For example, in order to sense/track an object traversing the front of the vehicle in the intersection area, the object is first sensed by the information sensed by the corner radar sensor having the largest sensing angle, and then it is possible to track the object by sequentially using the information sensed by the front radar sensor having the middle sensing angle and the information sensed by the camera apparatus having the smallest sensing angle.

In addition, the tracker 120 may select N objects (N is a natural number of 2 or more) among the objects sensed by the sensing unit 110, and may track progress paths for only the selected N objects (e.g., eight objects).

The tracker 120 may subdivide a sensing region into a plurality of regions, may assign priority to each of the regions, and may then select N objects in order from an object positioned in the highest priority region.

Figure 4:
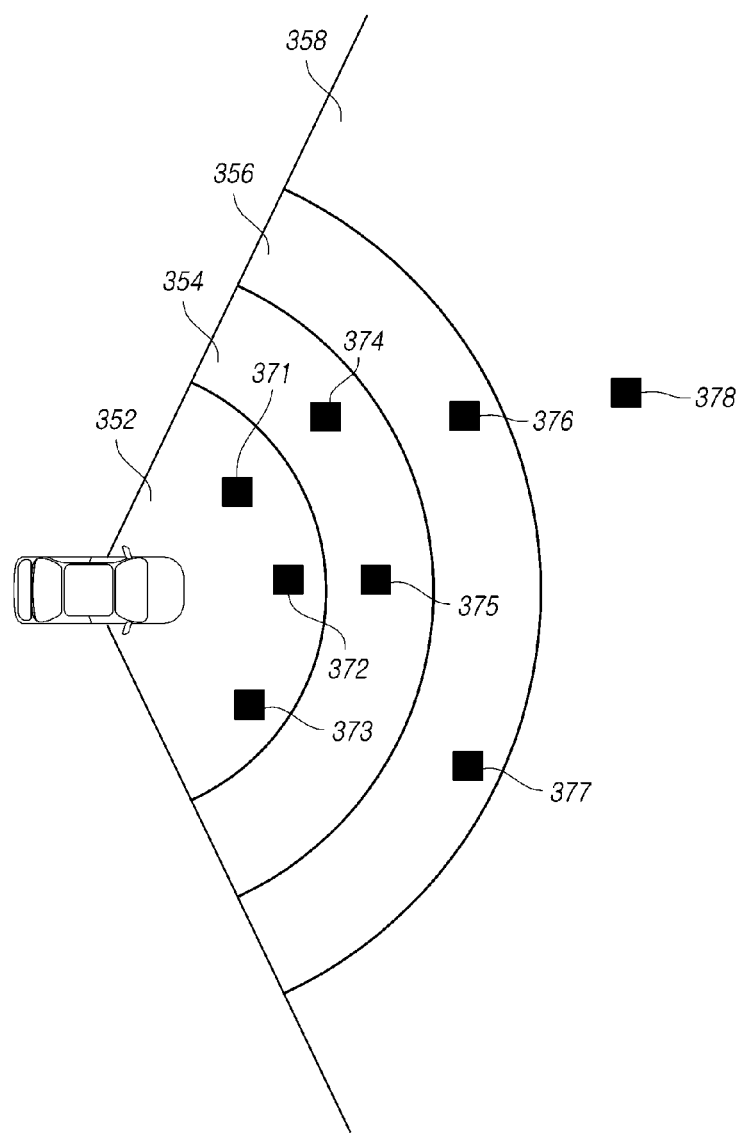
FIG. 4 is a diagram illustrating sensing regions classified by priority in the first embodiment.

FIG. 4 is a diagram illustrating a sensing region divided by priority in the first embodiment.

As illustrated in FIG. 4, the sensing region may be divided into a plurality of regions 352, 354, 356, and 358.

The tracker 120 may select and track a predetermined number (N) of objects according to hardware or software constraints. At this time, the tracker 120 may sequentially select N objects in order from an object positioned in the highest priority region.

For example, assuming that the tracker 120 tracks six objects, the tracker 120 may select three objects 371, 372, and 373 in the first area 352 having the highest priority, may then select two objects 374 and 375 in a second area 354 having the next highest priority, and may then select the remaining one object 376 in a third area 356 having the next highest priority. In addition, the tracker 120 may sense the remaining objects 377 and 378, but may not track the remaining objects 377 and 378.

The tracker 120 may select N objects and may then exclude objects with low relevance to the host vehicle (e.g., the objects having a low possibility of collision with the host vehicle), and additionally track again as many objects as the number of the excluded objects. For example, the tracker 120 may exclude an object moving away from the host vehicle or an object having a low possibility of collision from the tracking of the progress path, and may additionally track objects as many as the number of the excluded objects.

In the example of FIG. 4, when the first object 371 is positioned in a higher priority region than the seventh object 377 but the first object 371 is moving away from the host vehicle, the tracker 120 may exclude the first object 371 from the list of the selected N objects, and may select the seventh object 377.

The tracker 120 may calculate a Time-To-Collision (TTC) value for each of a plurality of objects sensed by the sensing unit 110, and may select N objects from objects having the lowest TTC value.

Figure 5:
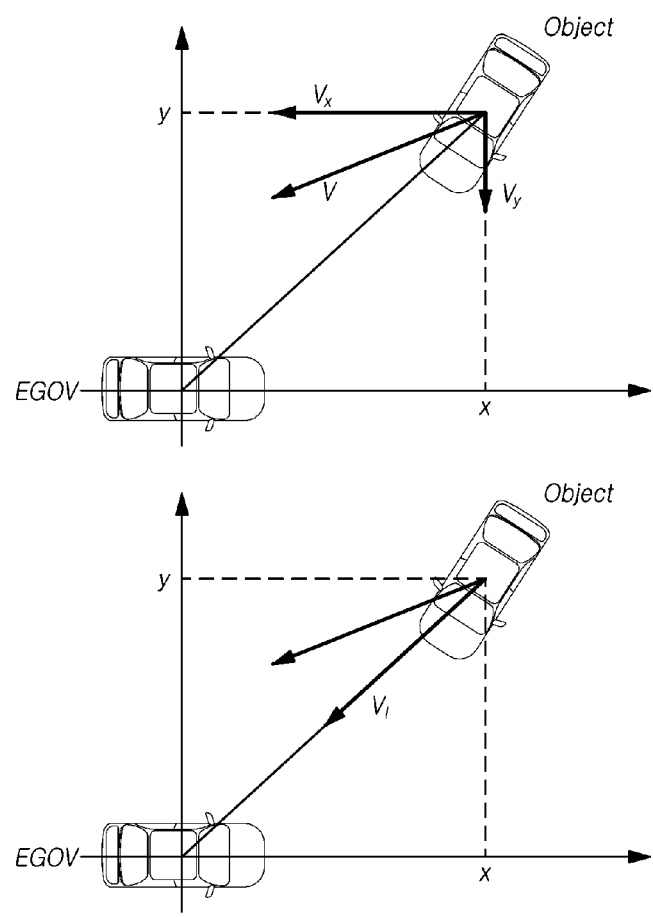
FIG. 5 is a diagram illustrating velocity components that may be used for calculating a TTC in the first embodiment.

FIG. 5 is a diagram illustrating velocity components that may be used for calculating a TTC in the first embodiment.

The TTC may be calculated separately in X and Y directions, or may be calculated in only one direction.

Assuming that the progress direction of the host vehicle EGOV is the X direction and the direction perpendicular to the X direction is the Y direction, the velocity V of the object may be divided into an X direction velocity $V_x$ and a Y direction velocity $V_y$. Then, the TTC may be calculated for the velocities $V_x$ and $V_y$ in each direction.

$$TTC_x = \frac{-V_x + \sqrt{V_x^2 - 2 \cdot ax \cdot x}}{ax}$$ Equation 1

$$TTC_y = \frac{-V_y + \sqrt{V_y^2 - 2 \cdot ay \cdot y}}{ay}$$

Here, ax denotes acceleration in the X direction of an object, ay denotes acceleration in the Y direction of the object, x denotes an X direction coordinate, and y denotes a Y direction coordinate.

The TTC may be calculated in the direction in which the host vehicle EGOV and the object are connected in a straight line.

$$TTC_l = \frac{D}{\dot{D}} = \frac{\sqrt{x^2 + y^2}}{V_l}$$ Equation 2

Here, $V_l$ denotes the object velocity in the direction in which the object EGOV and the object are connected in a straight line.

As described above with reference to FIG. 4, the tracker 120 may calculate a Time-To-Collision (TTC) value for each of a plurality of objects sensed by the sensing unit 110, and may select N objects from objects having the lowest TTC value.

When progress path tracking data for N objects is generated by the tracker 120, the scenario device 130 applies a progress path scenario to each object, the path of which is tracked based on the progress path tracking data.

Further, in addition to the information sensed by the sensing unit, the tracker 120 according to the present exemplary embodiment may determine the progress scenario for each object by further using vehicle information, lane information, etc., provided by a navigation system or a GPS, and camera information obtained by sensing turn signal lamps of target vehicles which are the objects.

Figure 6:
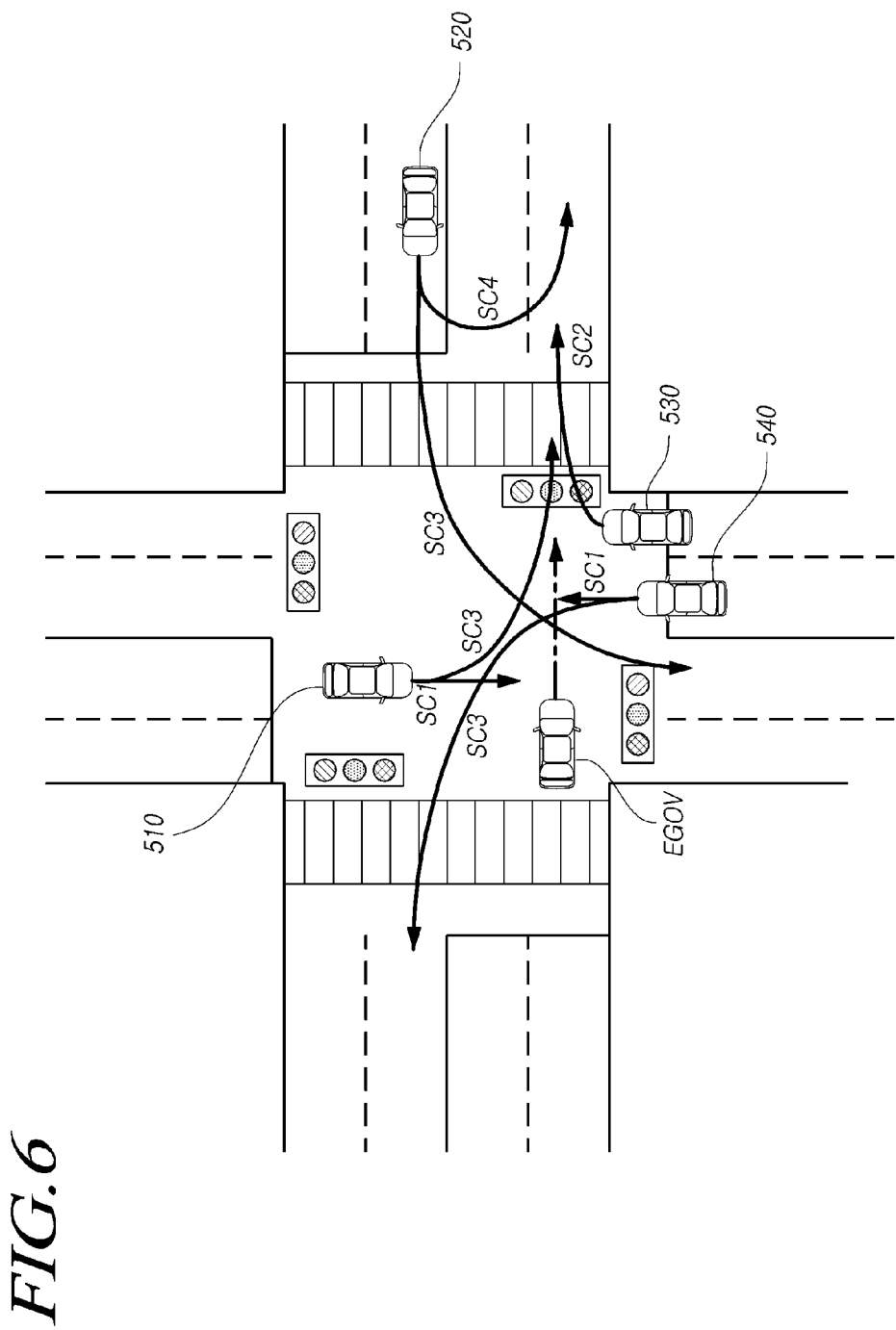
FIG. 6 is a diagram illustrating a progress path scenario of an object at an intersection in the first embodiment.

FIG. 6 is a diagram illustrating a progress path scenario of an object at an intersection.

Referring to FIG. 6, a first object 510 may go straight or turn left. The scenario device 130 may apply a straight-forward path scenario SC1 or the left-turn path scenario SC3 to the first object 510, based on the progress path tracking data generated by the tracker 120.

A second object 520 may turn left or may make a U-turn. The scenario device 130 may apply a left-turn path scenario SC3 or a U-turn path scenario SC4 to the second object 520, based on the progress path tracking data.

A third object 530 may turn right. The scenario device 130 may apply a right-turn path scenario SC2 to the third object 530, based on the progress path tracking data.

A fourth object 540 may go straight or turn left. The scenario device 130 may apply the straight-forward path scenario SC1 or the left-turn path scenario SC3 to the fourth object 540, based on the progress path trace data.

When the scenario device 130 applies a progress path scenario to an object, the controller 140 may determine a possibility of collision between the object and the host vehicle EGOV according to the applied progress path scenario, and may display the possibility of collision on the display device or may provide an alarm to the driver via an audiovisual device. Alternatively, the controller 140 may control the host vehicle EGOV according to the possibility of collision.

An exemplary embodiment of determining the possibility of collision according to a progress path scenario will be described in more detail with reference to FIGS. 6 and 7.

FIGS. 7 to 12 are diagrams each illustrating a progress path scenario in the case in which the possibility of collision at an intersection is relatively high.

Figure 7:
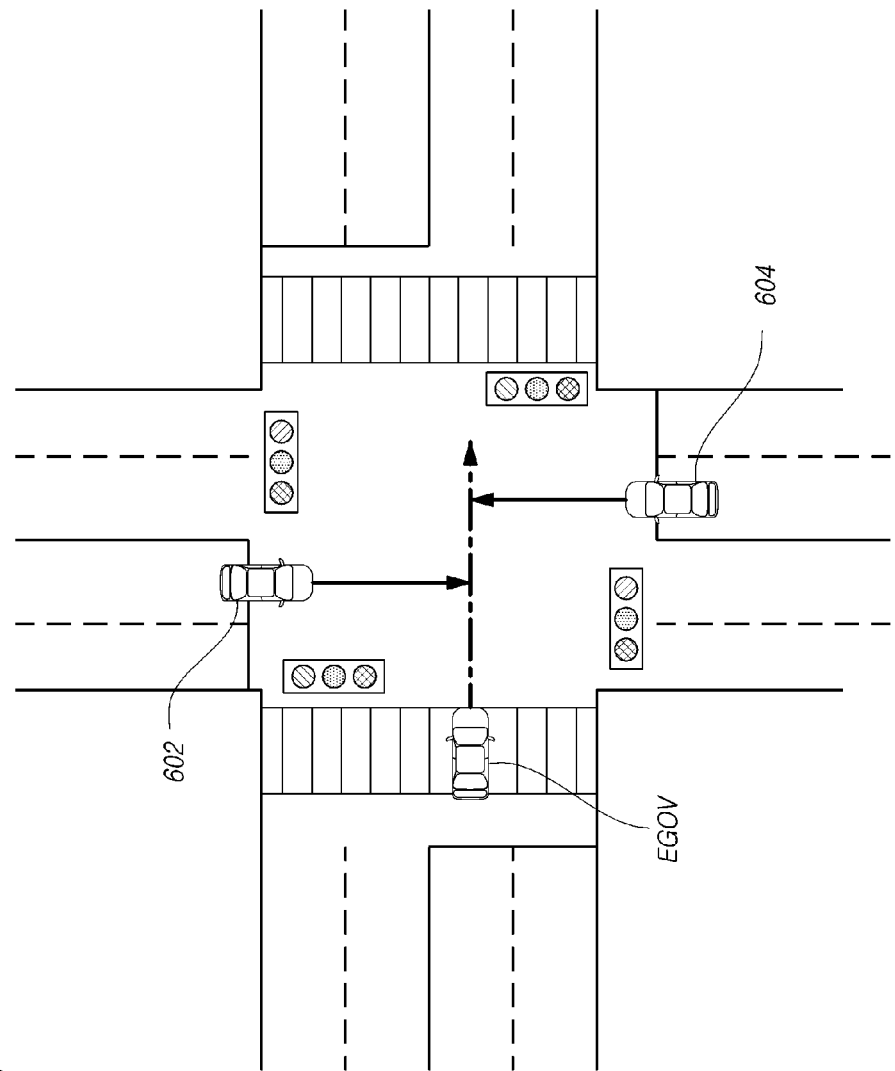
FIGS. 7 to 12 are diagrams each illustrating a progress path scenario in which a possibility of collision at an intersection is high in the first embodiment.

Referring to FIG. 7, a vehicle 602 and a vehicle 604 are applied with a straight-forward path scenario. At this time, because the vehicle 602 and the vehicle 604 progress in a direction perpendicular to the progress path of the host vehicle EGOV, there is a high possibility of collision with the host vehicle EGOV.

The controller 140 may predict the progress path of the host vehicle EGOV and may determine the possibility of collision between the objects and the host vehicle EGOV using the progress path of the host vehicle and the progress path scenarios that are applied to each of the objects, respectively.

Figure 8:
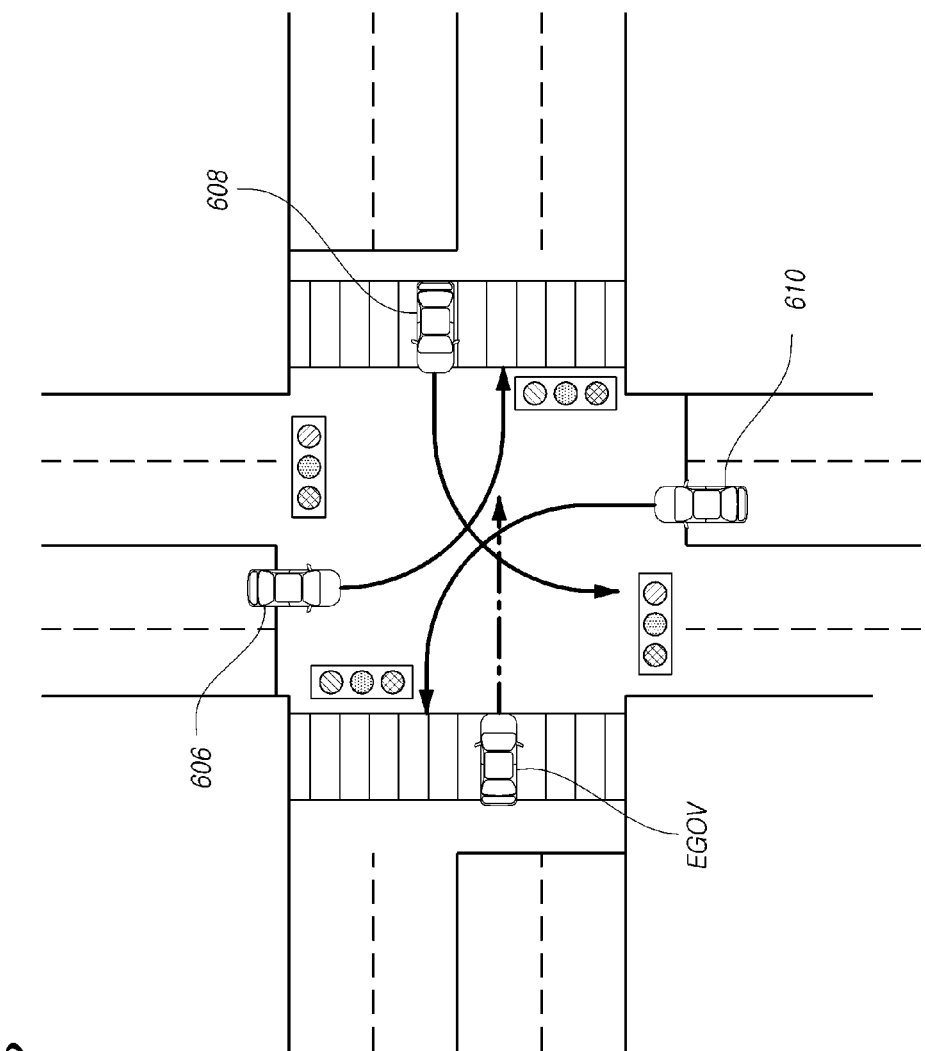

Referring to FIG. 8, it is predicted that the host vehicle EGOV will go straight. At this time, the progress path scenarios applied to the vehicles 606, 608, and 610 are the progress path scenarios in which the progress paths intersect the progress path of the host vehicle. When the progress path scenarios applied to the objects are progress path scenarios in which progress paths intersects with the progress path of the host vehicle EGOV, the controller 140 may determine that the possibility of collision is higher than that of a progress path scenario in which the progress path does not intersect the progress path of the host vehicle.

Specifically, when a straight-forward path scenario is applied to the vehicle 608, it may be determined that the vehicle 608 has a low possibility of collision with the host vehicle EGOV. However, when a left-turn path scenario is applied to the vehicle 608 as illustrated in FIG. 8, it may be determined that the vehicle has a high possibility of collision with the host vehicle EGOV.

Figure 9:
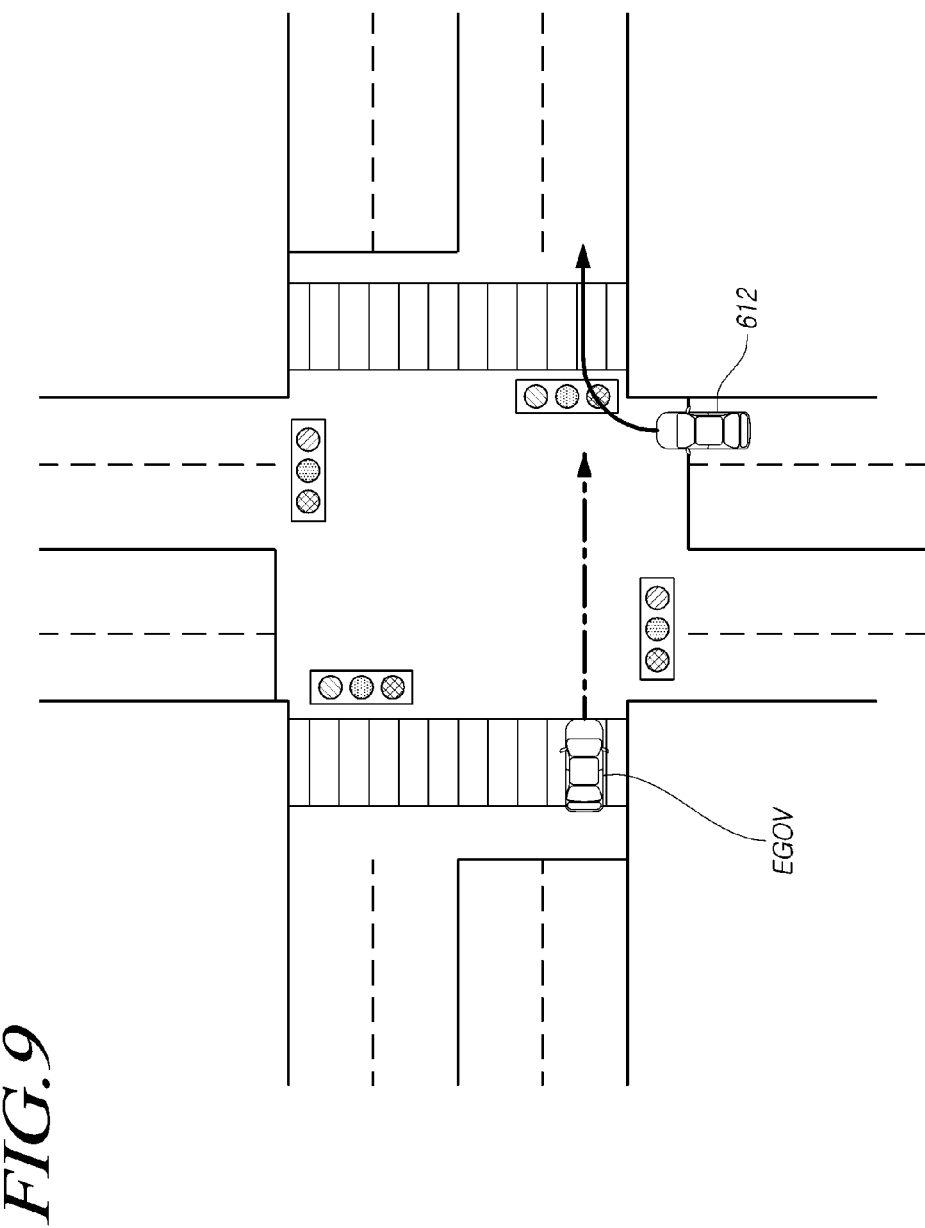

When a right-turn path scenario is applied to the vehicle 612 as illustrated in FIG. 9 and the host vehicle EGOV is predicted to go straight, it may be determined that the possibility of collision between the vehicle 612 and the host vehicle EGOV is high.

Figure 10:
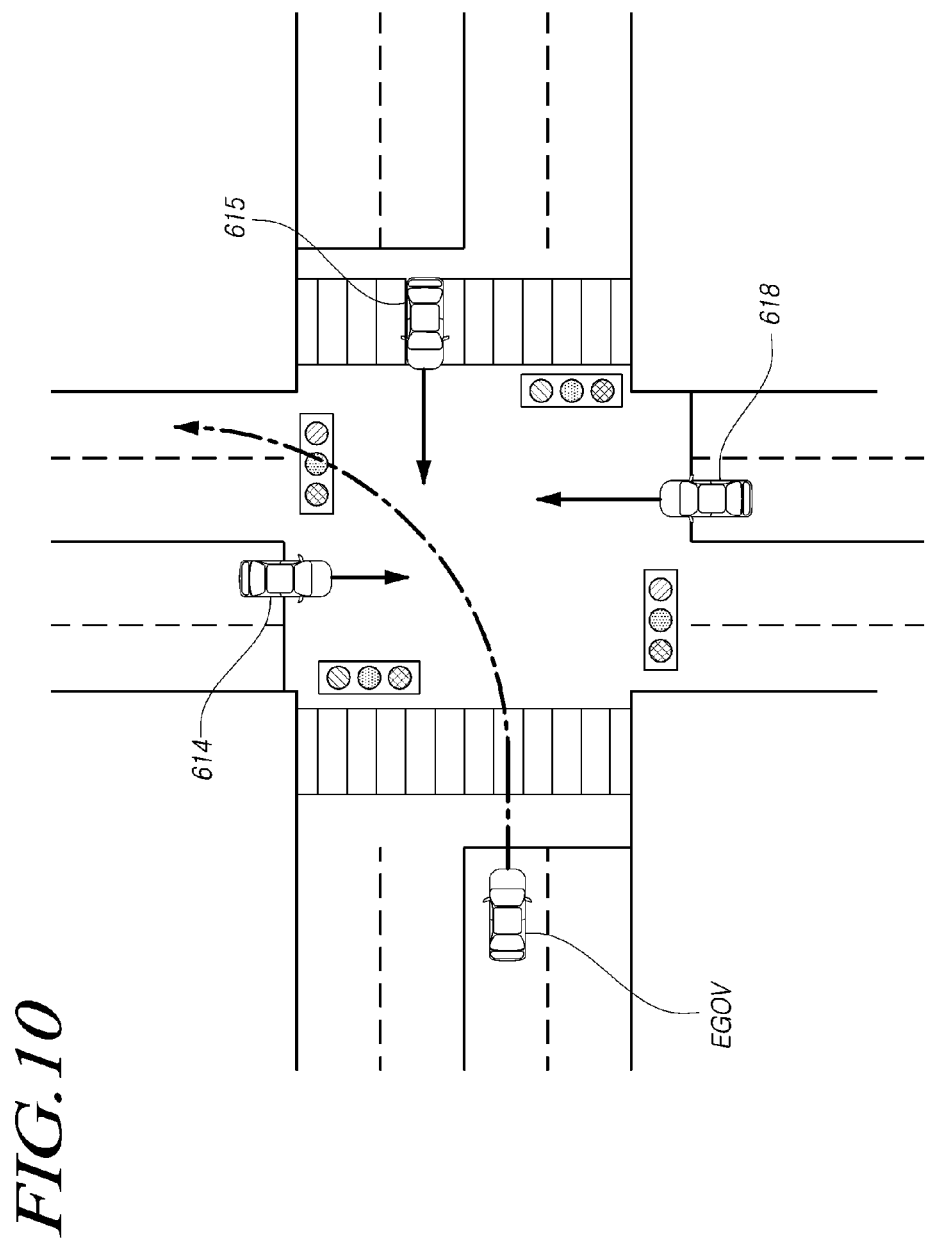

In FIG. 10, when the host vehicle EGOV is predicted to turn left and straight-forward path scenarios are applied to the vehicles 614, 616, and 618, respectively, the possibility of collision between the corresponding vehicles and the host vehicle EGOV is high.

Figure 11:
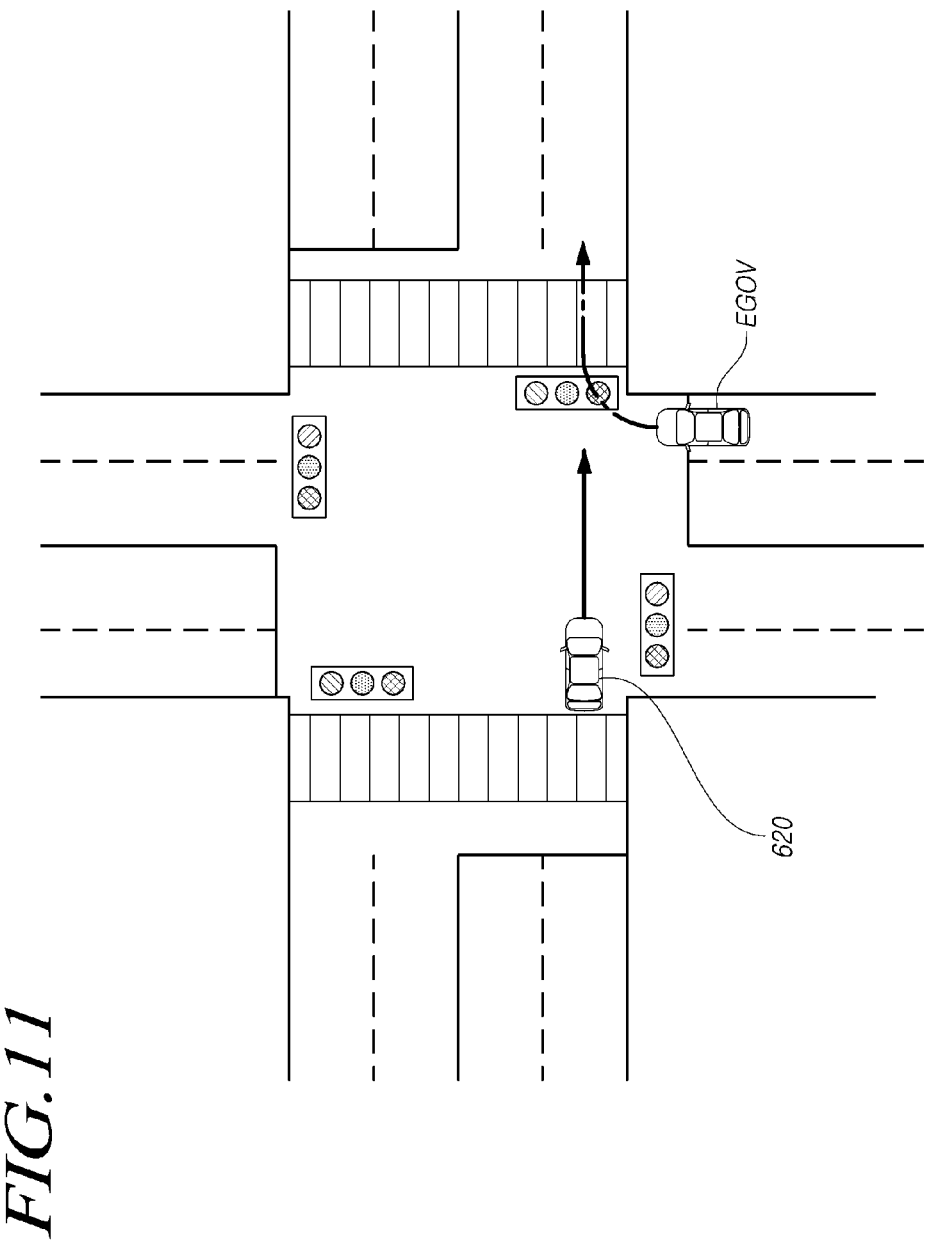

Also, in FIG. 11, when the host vehicle EGOV is predicted to turn right and a right-turn scenario is applied to the vehicle 620, it is determined that the possibility of collision between the vehicle 620 and the host vehicle EGOV is high.

Figure 12:
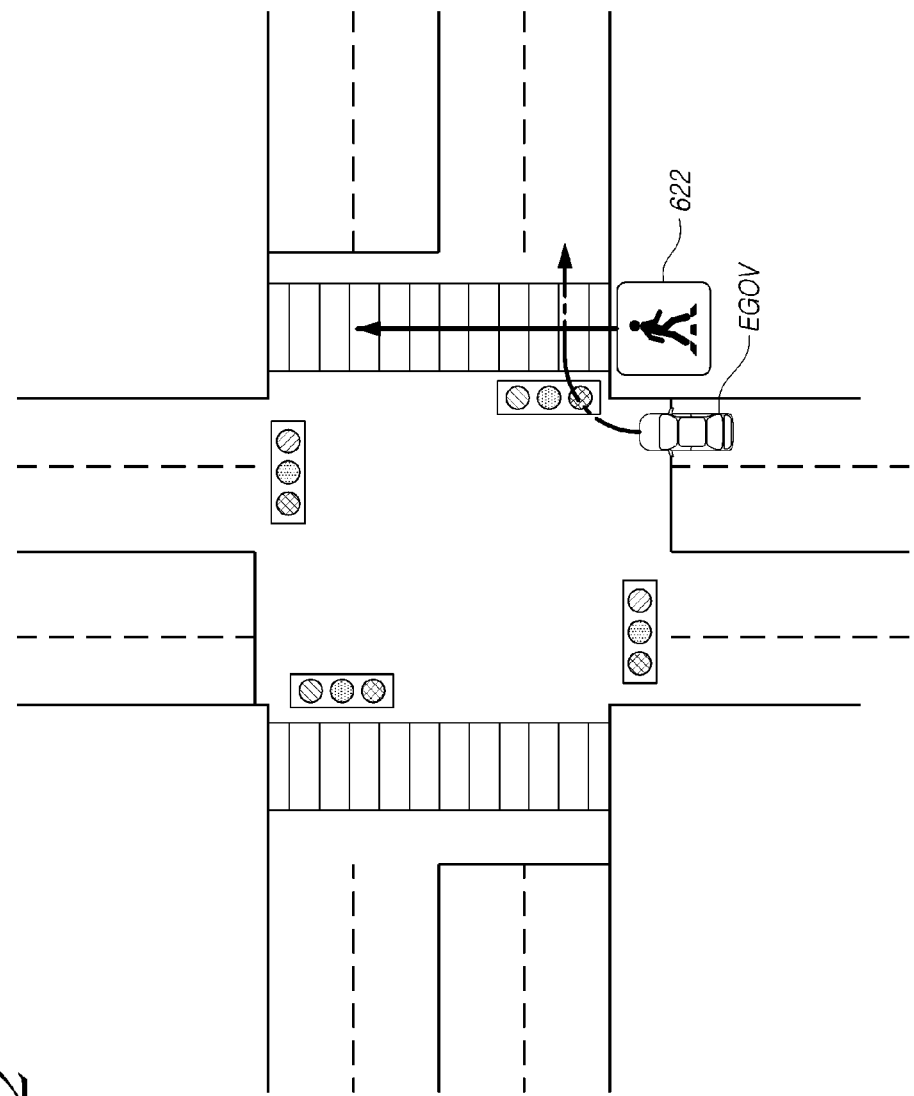

An object may be a pedestrian, etc. In FIG. 12, when the host vehicle EGOV is predicted to turn right and a transverse path scenario is applied to a pedestrian 622, it is determined that the possibility of collision between the pedestrian 622 and the host vehicle EGOV is high.

Figure 13:
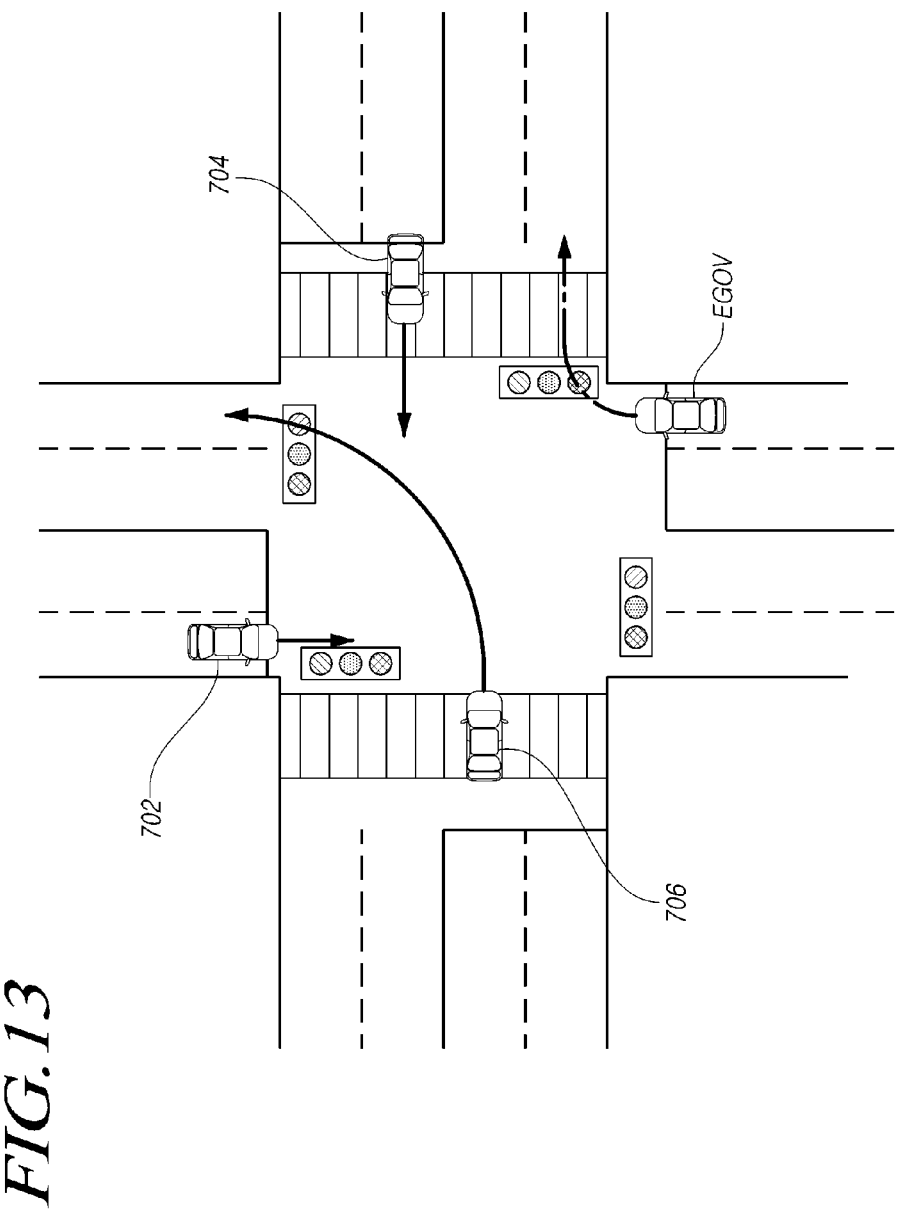
FIGS. 13 to 15 are diagrams each illustrating a progress path scenario in which a possibility of collision at an intersection is low in the first embodiment.
Figure 14:
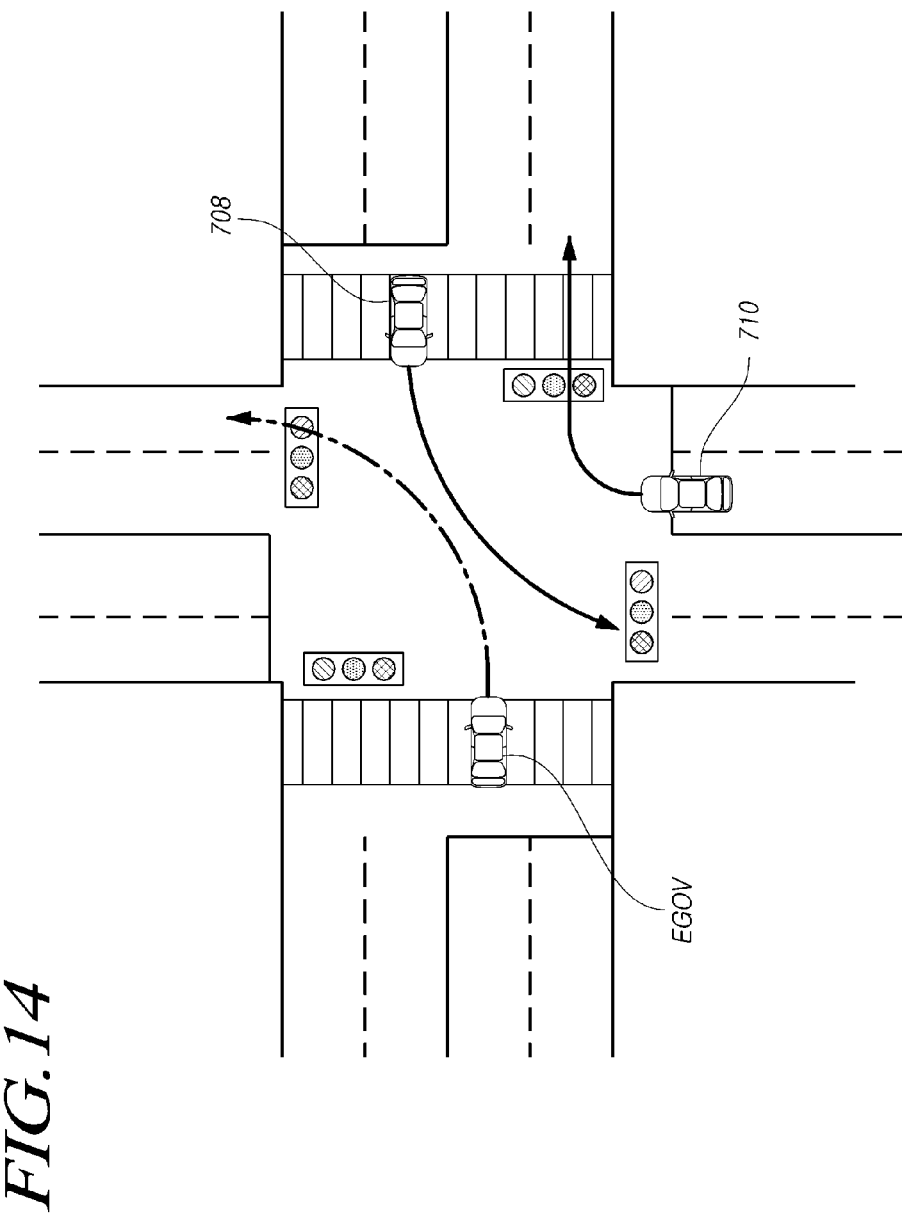
Figure 15:
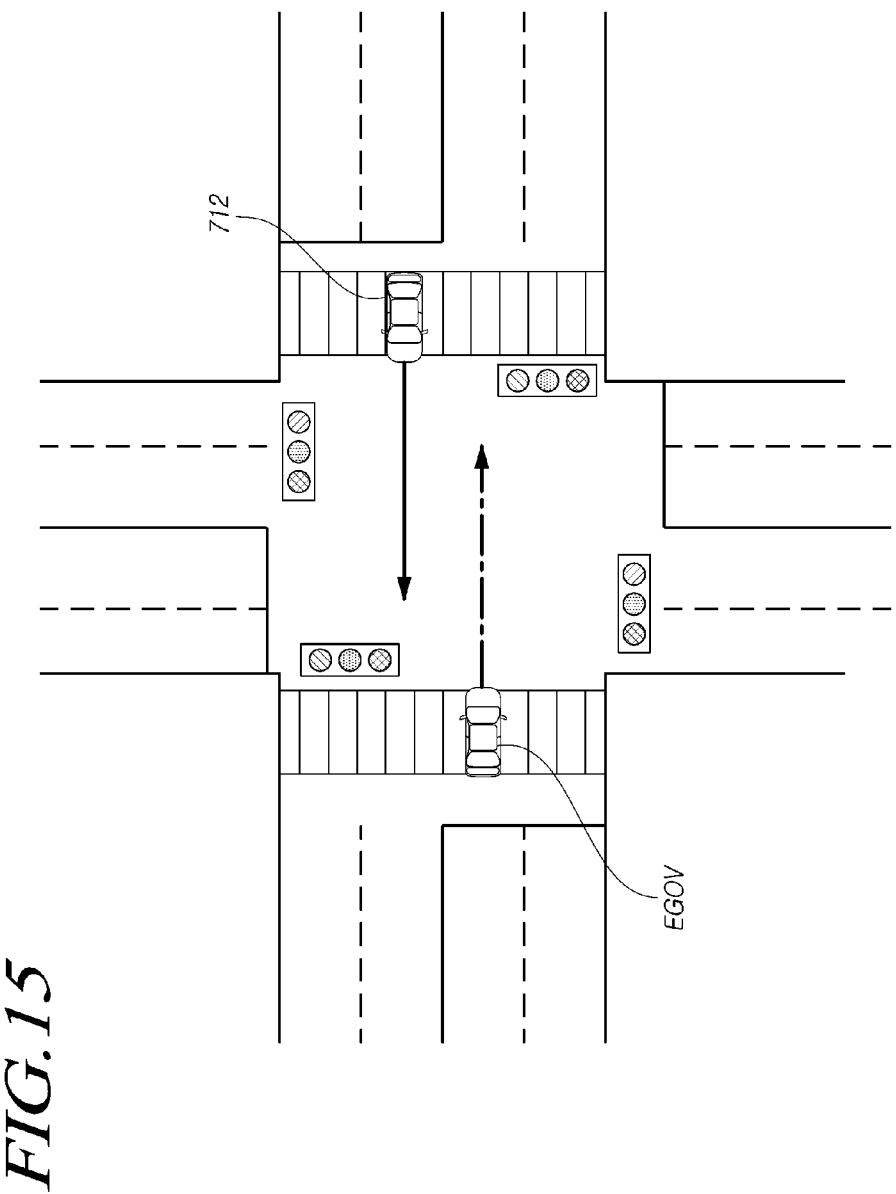

FIGS. 13 to 15 are diagrams each illustrating a progress path scenario in the case in which the possibility of collision at an intersection is relatively low.

Referring to FIG. 13, when the host vehicle EGOV is predicted to turn right and a vehicle 702 is applied with a straight-forward path scenario at the opposite side, it is determined that the possibility of collision between the vehicle 702 and the host vehicle EGOV is low. Further, when the vehicle 704 is applied with a straight-forward path scenario in a direction in which the progress path of the vehicle 704 does not intersect the progress path of the host vehicle EGOV, it is determined that the possibility of collision between the vehicle 704 and the host vehicle EGOV is low. Further, when a vehicle 706 is applied with a left-turn path scenario in a direction in which the progress path of the vehicle 706 does not intersect the progress path of the host vehicle EGOV, it is determined that the possibility of collision between the vehicle 706 and the host vehicle EGOV is low.

Referring to FIG. 14, when the host vehicle EGOV is predicted to turn left, a vehicle 708 is applied with a left-turn path scenario at the opposite side, and a vehicle 710 is applied with a right-turn path scenario in the direction in which the progress path of the vehicle 710 does not intersect the progress path of the host vehicle EGOV, thus it is determined that the possibility of collision between the vehicles 708 and 710 and the host vehicle EGOV is low.

Referring to FIG. 15, when the host vehicle EGOV is predicted to turn right and a vehicle 712 is applied with a straight-forward path scenario at the opposite side, it is determined that the possibility of collision between the vehicle 712 and the host vehicle EGOV is low.

In the examples described with reference to FIGS. 7 to 15, the controller 140 may predict the progress path of the host vehicle through the travel information of the host vehicle EGOV such as previous progress path data and the direction indicating operation state of the host vehicle EGOV.

The controller 140 may determine scenarios for the progress path of the objects at an intersection, may determine the possibility of collision between the host vehicle and each of the objects according to the determined scenario, may calculate a TTC for at least one of the objects which is determined to have a relatively high possibility of collision, and may control the host vehicle based on the calculated TTC. At this time, the controller 140 may control the steering device or the braking device of the host vehicle.

Figure 16:
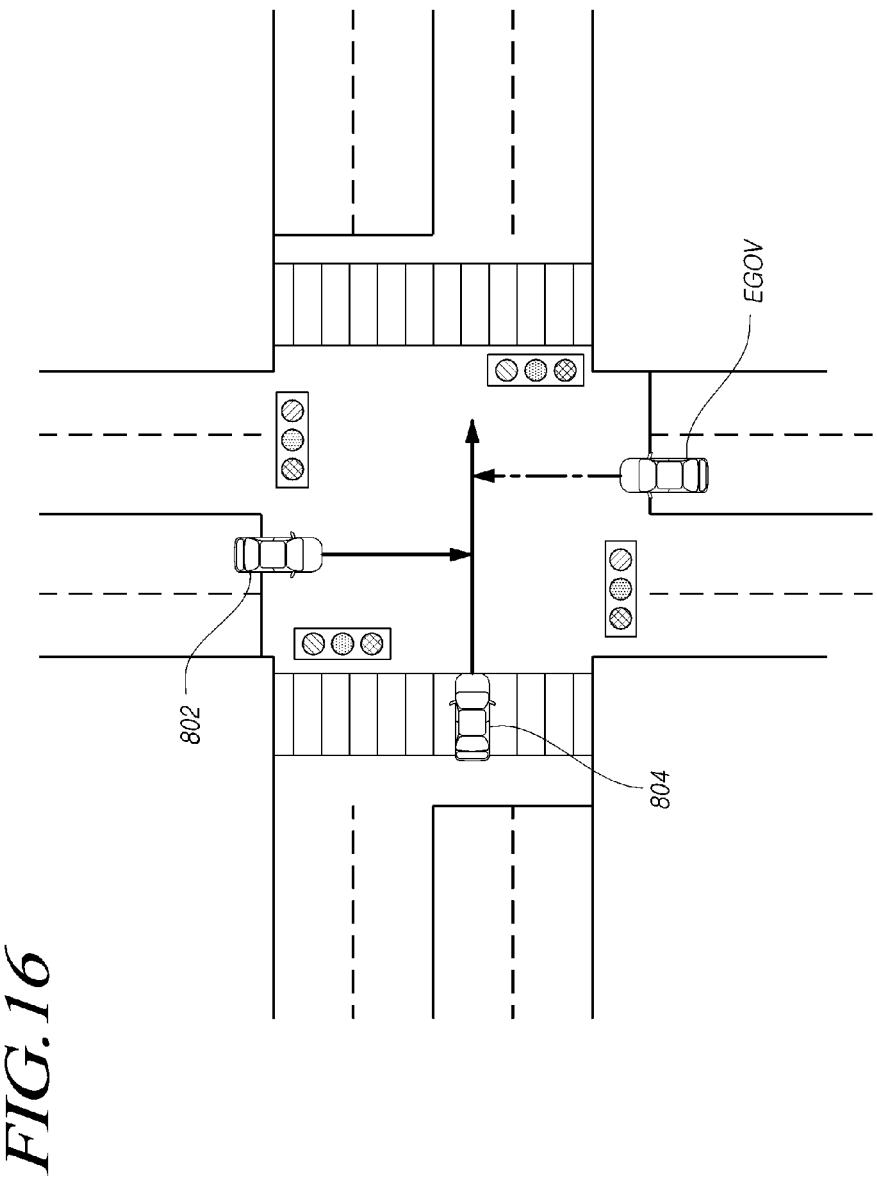
FIG. 16 is a diagram illustrating a progress path scenario in which possibilities of collision at an intersection are different from each other in the first embodiment.

FIG. 16 is a diagram illustrating a progress path scenario in which possibilities of collision at an intersection are different from each other.

Referring to FIG. 16, it is assumed that the EGOV is predicted to go straight, a vehicle 802 is applied with a the straight-forward path scenario at the opposite side, and a vehicle 804 is applied with a straight-forward route scenario in a direction in which the progress path of the vehicle 804 intersects the progress path of the host vehicle EGOV.

At this time, considering the progress direction of the host vehicle EGOV, the possibility of collision of the vehicle 802 is determined to be low, and the possibility of collision of the vehicle 804 is determined to be high. At this time, the controller 140 may control the host vehicle on the basis of the vehicle 804 having a relatively high possibility of collision.

As a specific example, the controller 140 may calculate the TTC for each of the vehicle 802 and the vehicle 804. At this time, the controller 140 may confirm that the possibility of collision of the vehicle 804 is higher than the possibility of collision of the vehicle 802, and may display the calculated TTC for the vehicle 804 to the driver, or may control the host vehicle EGOV according to the TTC calculated for the vehicle 804.

The tracker 120, the scenario device 130, the controller 140, and the like that are used in the vehicle control device 100 according to the first embodiment may be implemented as a part of an integrated control device or an ECU installed in the vehicle.

The integrated control device or ECU of such a vehicle may include a storage device, such as a processor and a memory, a computer program capable of being executed by a processor (e.g., computer, etc.) to perform a specific function, and the like. The tracker 120, the scenario device 130, the controller 140, etc., may be implemented as software modules capable of performing respective intrinsic functions.

As described above, according to the first embodiment of the present disclosure, it is possible to define respective scenarios corresponding to various combinations of progress paths of the host vehicle and objects (target vehicles) in an intersection area, and to save in advance plural pieces of progress scenario information in which the possibilities of collision are differently set for respective scenarios.

Then, when the host vehicle actually enters an intersection area, it is possible to determine the scenarios to be applied after tracking the behavior of the host vehicle and the progress paths of objects (target vehicles), and to perform the control of the host vehicle by comprehensively taking the possibilities of collision set in the scenarios and TTCs to the objects into consideration.

Figure 17:
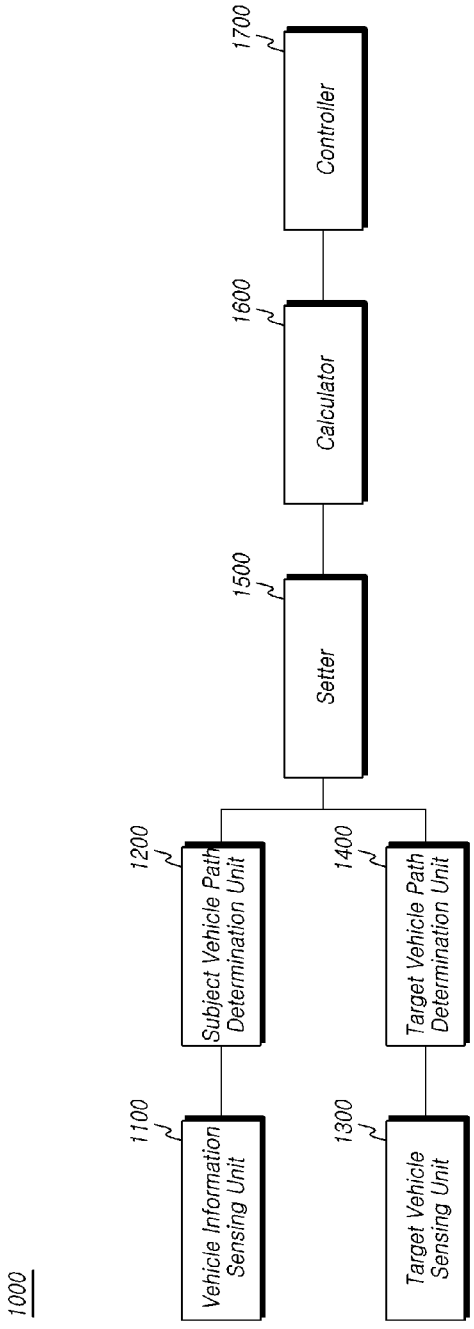
FIG. 17 is a diagram illustrating a configuration of a vehicle control device according to a second exemplary embodiment of the present disclosure.

FIG. 17 is a diagram illustrating a configuration of a vehicle control device according to a second exemplary embodiment of the present disclosure.

Referring to FIG. 17, a vehicle control device 1000 according to a second embodiment of the present disclosure includes: a vehicle information sensing unit 1100 configured to sense vehicle information that is at least one of a vehicle speed, a gear position, a yaw rate, a steering angle, or a turn signal lamp; a host vehicle path-determining unit 1200 configure to determine a path of the host vehicle based on the vehicle information; a target vehicle sensing unit 1300 configured to sense a target vehicle based on external information which is at least one of camera image information acquired from a camera configured to monitor a front side, first radar information acquired from a front radar configured to monitor the front side, and second radar information acquired from corner radars configured to respectively monitor both lateral sides; a target vehicle path determination unit 1400 configured to determine a path of the target vehicle based on the external information; a setter 1500 configured to set a region of interest based on the path of the host vehicle and the path of the target vehicle; a calculator 1600 configured to calculate a speed of a vehicle of interest which is the target vehicle positioned in the region of interest based on the external information, and to calculate a Time-To-Collision (TTC) value; and a controller 1700 configured to control a notification device or a control device based on the TTC with the vehicle of interest.

The vehicle information sensing unit 1100 may sense vehicle information that is at least one of: a vehicle speed sensed using a vehicle speed sensor included in the vehicle; a gear position sensed using a gear position sensor; a yaw rate sensed using a yaw rate sensor; or a steering angle sensed using a steering angle sensor and a turn signal lamp using a turn signal lamp sensor.

As described above, the vehicle information sensing unit 1100 may sense the vehicle information using the sensor that senses the vehicle speed, the gear position, the yaw rate, the steering angle, and the turn signal lamp, respectively, but is not limited thereto. That is, the vehicle information sensing unit 110 may sense other vehicle information using sensors configured to sense factors other than the vehicle speed, the gear position, the yaw rate, the steering angle, and the turn signal lamp, and may sense a vehicle speed, a gear position, a yaw rate, a steering angle, and a turn signal lamp based on a mathematical relationship or a mechanical relationship of other sensed vehicle information.

The vehicle path determining unit 1200 may determine the path of the host vehicle based on the vehicle information sensed by the vehicle information sensing unit 110.

For example, when the vehicle information of the yaw rate, the steering angle, and the turn signal lamp corresponds to the left turn, the host vehicle path determination unit 1200 may determine the path of the host vehicle as a left turn.

Further, when the vehicle information of the vehicle speed and gear position corresponds to the progress and the vehicle information of the yaw rate, the steering angle, and the turn signal lamp corresponds to the left turn, the host vehicle path determination unit 1200 may determine the path of the host vehicle as progress and left turn.

As one example, the host vehicle path determination unit 1200 may determine the path of the host vehicle using one or more pieces of vehicle information of the vehicle speed, the gear position, the yaw rate, the steering angle, and the turn signal lamp, rather than all the vehicle information.

The other vehicle sensing unit 1300 may sense a target vehicle based on external information which is at least one of: camera image information acquired from a camera (e.g., image sensor) configured to monitor the front side; first radar information acquired from a front radar configured to monitor the front side; and a second radar information acquired from corner radars installed on both sides of the vehicle, respectively, so as to monitor the both sides.

With respect to the camera and radars operating as described above, the camera may be installed to face the front side of the vehicle in order to acquire the camera image information, and the first radar may be installed to face the front side of the vehicle in order to acquire the first radar information, and the second radar information may be obtained by installing the corner radars to both sides of the vehicle. The camera may include a stereo camera.

The other vehicle sensing unit 1300 may sense a target vehicle based on external information that is at least one of the camera image information, the first radar information, and the second radar information obtained as described above.

The target vehicle path determination unit 1400 may determine a target vehicle path that is a traveling path of the target vehicle sensed by the target vehicle sensing unit 130.

For example, the target vehicle sensing unit 1300 may sense target vehicles at predetermined time intervals. The target vehicle path determination unit 1400 may determine the paths of the target vehicles as a left turn, straight forward, or a right turn, based on the positions of the target vehicles sensed at the predetermined time intervals.

The setter 150 may set a region of interest based on the path of the host vehicle determined by the host vehicle path determination unit 1200 and the path of a target vehicle determined by the target vehicle path determination unit 1400.

As a first example, when the host vehicle path determination unit 1200 determines the path of the host vehicle as a left turn and the target vehicle path determination unit 1400 determines the path of a first target vehicle approaching from the left side as a left turn or straight forward, the setter 1500 may set the left side as a region of interest.

As a second example, when the host vehicle path determination unit 1200 determines the path of the host vehicle as a left turn and the target vehicle path determination unit 1400 determines the path of a second target vehicle approaching from the front side as a left turn, straight forward, or a right turn, the setter 1500 may set the front side as a region of interest.

That is, when the host vehicle path determination unit 1200 determines the path of the host vehicle as a left turn and the target vehicle sensing unit 1300 senses the second target vehicle approaching from the front side, the setter 150 may set the front side the region of interest regardless of the path of the second target vehicle.

Accordingly, when the host vehicle path determination unit 1200 determines the path of the host vehicle as a left turn and the target vehicle sensing unit 1300 senses the second vehicle approaching from the front side, the target vehicle path determination unit 1400 may not determine the path of the second target vehicle.

As a third example, when the host vehicle path determination unit 1200 determines the path of the host vehicle as a left turn and the target vehicle path determination unit 1400 determines the path of a third target vehicle approaching from the right side as a left turn or straight forward, the setter 1500 may set the right side as a region of interest.

As a fourth example, when the host vehicle path determination unit 1200 determines the path of the host vehicle as straight forward and the target vehicle path determination unit 1400 determines the path of a first target vehicle approaching from the left side as a left turn or straight forward, the setter 1500 may set the left side as a region of interest.

As a fifth example, when the host vehicle path determination unit 1200 determines the path of the host vehicle as straight forward and the target vehicle path determination unit 1400 determines the path of a second target vehicle approaching from the front side as a left turn, the setter 1500 may set the front side as a region of interest.

As a sixth example, when the host vehicle path determination unit 1200 determines the path of the host vehicle as straight forward and the target vehicle path determination unit 140 determines the path of a third target vehicle approaching from the right side as a left turn, straight forward, or a right turn, the setter 1500 may set the right side as a region of interest.

That is, when the host vehicle path determination unit 1200 determines the path of the host vehicle as straight forward and the target vehicle sensing unit 1300 senses the third target vehicle approaching from the right side, the setter 1500 may set the right side the region of interest regardless of the path of the third target vehicle.

Accordingly, when the host vehicle path determination unit 1200 determines the path of the host vehicle as straight forward and the target vehicle sensing unit 1300 senses the third vehicle approaching from the right side, the target vehicle path determination unit 1400 may not determine the path of the third target vehicle.

As a seventh example, when the host vehicle path determination unit 1200 determines the path of the host vehicle as a right turn and the target vehicle path determination unit 1400 determines the path of a first target vehicle approaching from the left side as straight forward, the setter 1500 may set the left side as a region of interest.

As an eighth example, when the host vehicle path determination unit 1200 determines the path of the host vehicle as a right turn and the target vehicle path determination unit 1400 determines the path of a second target vehicle approaching from the front side as a left turn, the setter 1500 may set the front side as a region of interest.

The calculator 1600 may calculate a speed of a vehicle of interest which is a target vehicle positioned within the region of interest set by the setter 1500 based on external information that is at least one of the camera image information acquired from the camera configured to monitor the front side, the first radar information acquired from a radar configured to monitor the front side, and the second radar information acquired from a radar configured to monitor the both sides, and may calculate the TTC to the vehicle of interest using the calculated speed of the vehicle of interest.

For example, the vehicle sensing unit 130 may sense target vehicles at predetermined time intervals. The calculator 1600 may calculate the speed of the vehicle of interest, which is the target vehicle positioned within the region of interest set by the setter 1500 among the target vehicles, using the moving distance of the vehicle of interest according to a positional change of the vehicle of interest, and the predetermined time. Thereafter, the calculator 1600 may calculate a TTC with the vehicle of interest using the calculated speed of the vehicle of interest and the distance between the host vehicle and the vehicle of interest.

The controller 1700 may control the notification device or the control device based on the TTC with the vehicle of interest, which is calculated by the calculator 1600.

As an example, when the TTC with the vehicle of interest is smaller than a preset first time, the controller 1700 may control the notification device so as to provide a notification to the occupants including the driver.

As another example, when the TTC with the vehicle of interest is smaller than a preset second time, the controller 1700 may control the notification device and the control device to provide a notification to the occupants including the driver, and may decelerate the speed of the host vehicle.

In the above-described example, the first time may be longer than the second time.

A vehicle control device 1000 according to a second embodiment of the present disclosure, which operates as described above, may prevent the risk of collision by controlling the notification device or the control device based on the relationship with the vehicle of interest which is at risk of collision with the host vehicle among the target vehicles based on the path of the host vehicle and the paths of the target vehicles.

This may solve the problem that the notification device or the control device operates even though there is no risk of collision according to the path of the target vehicle, such problem being present in the existing intersection collision avoidance system that controls the host vehicle based on the TTC with the target vehicle irrespective of the path of the host vehicle and the path of the target vehicle.

Hereinafter, a vehicle control device operating as described above will be described in detail with reference to FIGS. 18 to 21.

Figure 18:
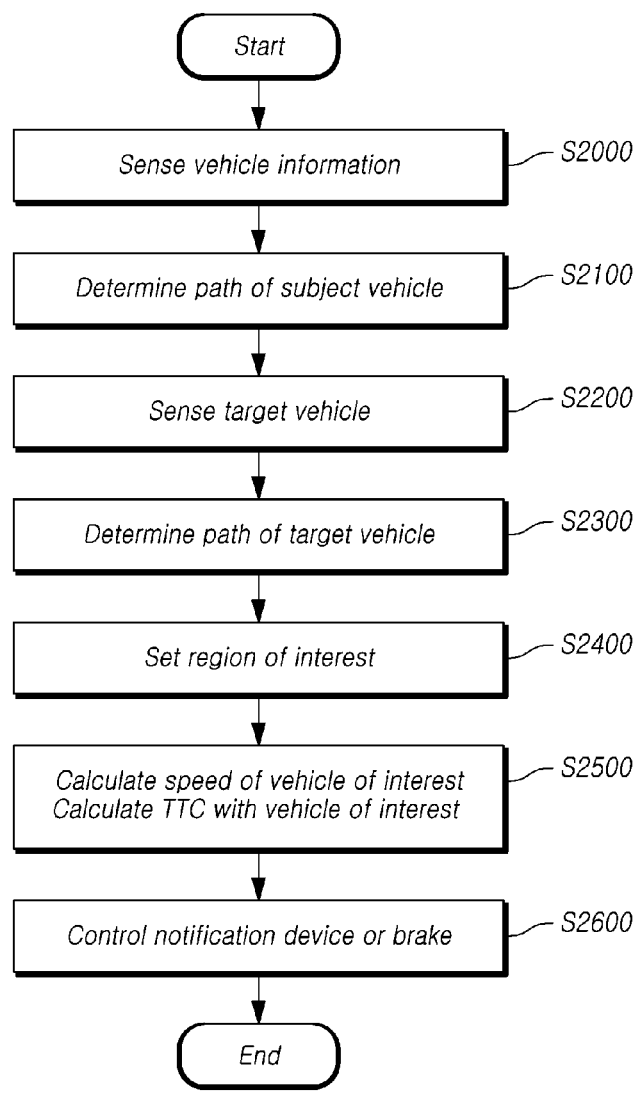
FIG. 18 is a diagram illustrating an example for describing an operation of a vehicle control device according to the second embodiment of the present disclosure.

FIG. 18 is a diagram illustrating one example for describing an operation of a vehicle control device according to the second embodiment of the present disclosure.

Referring to FIG. 18, the vehicle information sensing unit 2 of the vehicle control device according to the second embodiment of the present disclosure may sense vehicle information that is at least one of: a vehicle speed sensed using a vehicle speed sensor included in the vehicle; a gear position sensed using a gear position sensor; a yaw rate sensed using a yaw rate sensor; or a steering angle sensed using a steering angle sensor (S200).

As described above, the vehicle information sensing unit may sense the vehicle information using the sensor that senses the vehicle speed, the gear position, the yaw rate, the steering angle, and/or the turn signal lamp, respectively, but is not limited thereto. That is, the vehicle information sensing unit may sense, using sensors configured to sense factors other than the vehicle speed, the gear position, the yaw rate, the steering angle, and the turn signal lamp, and may sense a gear position, a yaw rate, a steering angle, and a turn signal lamp based on a mathematical relationship or a mechanical relationship of other sensed vehicle information.

Then, the host vehicle path determination unit determines the path of the host vehicle based on the vehicle information sensed in step S2000 (S2100).

For example, when the vehicle information of the yaw rate, the steering angle, and the turn signal lamp corresponds to the left turn, the host vehicle path determination unit 1200 may determine the path of the host vehicle as a left turn.

Further, when the vehicle information of the vehicle speed and gear position corresponds to the progress and the vehicle information of the yaw rate, the steering angle, and the turn signal lamp corresponds to the left turn, the host vehicle path determination unit may determine the path of the host vehicle as progress and a left turn.

As one example, the host vehicle path determination unit may determine the path of the host vehicle using one or more pieces of vehicle information of the vehicle speed, the gear position, the yaw rate, the steering angle, and the turn signal lamp, rather than all the vehicle information.

Thereafter, the target vehicle sensing unit senses a target vehicle based on external information which is at least one of: camera image information acquired from a camera configured to monitor the front side; first radar information acquired from a radar configured to monitor the front side; and second radar information acquired from a radar configured to monitor the both sides (S2200).

This will be described in detail with reference to FIG. 19.

Figure 19:
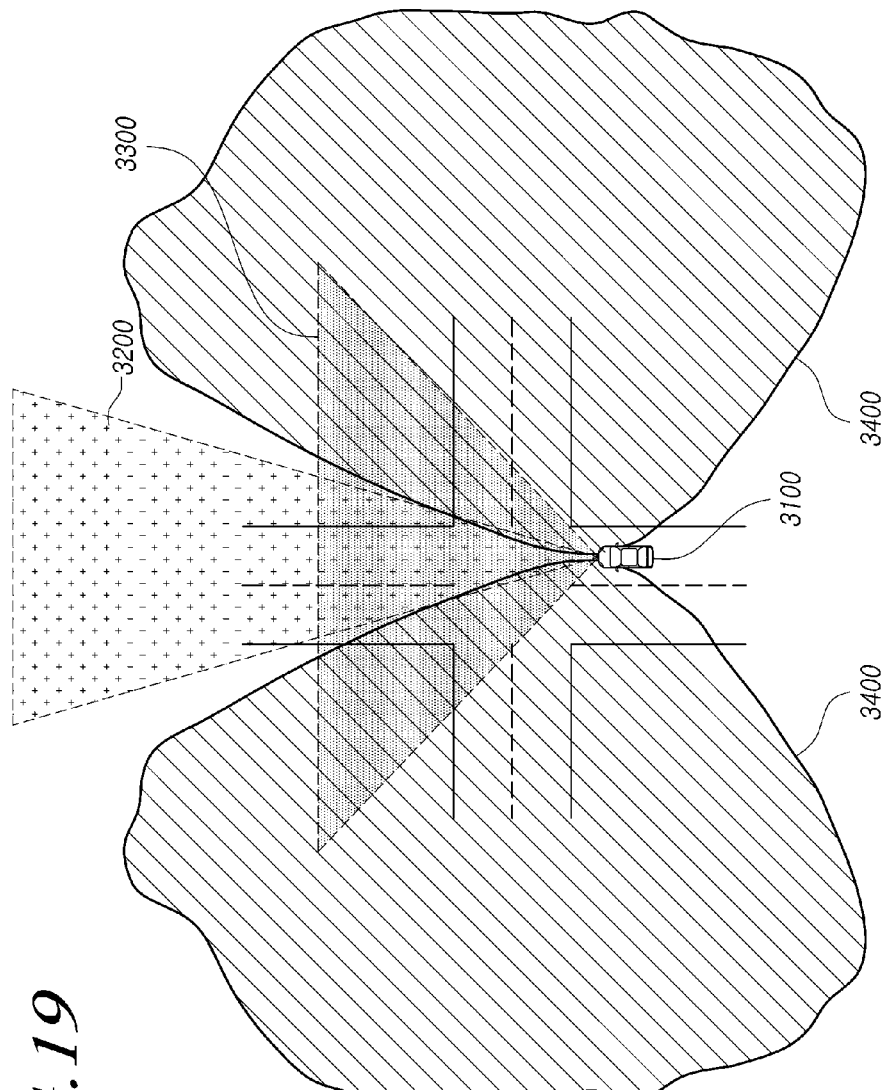
FIG. 19 is a diagram illustrating an example for describing an operation of a target vehicle sensing device according to the second embodiment of the present disclosure.

FIG. 19 is a diagram illustrating an example for describing an operation of a target vehicle sensing device according to the second exemplary embodiment of the present disclosure.

Referring to FIG. 19, the target vehicle sensing unit may sense target vehicles positioned in a first region 3200, a second region 3300, and a third region 3400 based on external information that is at least one of: camera image information acquired from a camera installed in the vehicle 3100 and configured to monitor the first region 3200; first radar information acquired from a radar installed in the vehicle 3100 and configured to monitor the second region 3300; and/or second radar information acquired from a radar installed in the host vehicle 3100 and configured to monitor the third region 34000. The camera configured to monitor the first region 3200 may be a stereo camera, the radar configured to monitor the second region 3300 may be a Long-Range Radar (LRR), and the radar configured to monitor the third region 3400 may be a corner radar.

In addition, for a region in which at least two of the first region 3200, the third region 3300, and the third region 3400 overlap, the target vehicle sensing unit may sense and track the target vehicles by applying a sensor fusion.

When a target vehicle is sensed, the target vehicle path determination unit determines the path of the target vehicle sensed in step S2200 based on the external information that is at least one of the camera image information, the first radar information, and/or the second radar information (S2300).

For example, in step S2200, the target vehicle sensing unit may sense target vehicles at predetermined time intervals. The target vehicle path determination unit may determine the paths of the target vehicles as a left turn, straight forward, or a right turn, based on the positions of the target vehicles sensed at the predetermined time intervals. The target vehicle sensing unit may perform an experiment for sensing each of a target vehicle that turns left, a target vehicle that goes straight forward, and a target vehicle that turns right, thereby acquiring in advance data for the positions of respective target vehicles, and the target vehicle path determination unit may determine the paths of the target vehicles based on the data.

In addition, the target vehicle sensing unit may track the objects by sequentially using second radar information sensed by the corner radar, first radar information sensed by the front radar, and camera image information sensed by the camera.

Then, the setter sets a region of interest based on the path of the host vehicle, which is determined in step S2100 and the path of a target vehicle, which is determined in step S2300 (S2400).

Specifically, when the path of the host vehicle in the intersection area is one of the straight forward, left turn, and right turn, the setter may set the region of interest depending on which one of straight forward, left turn, and right turn, the path of the target vehicle in the intersection area corresponds to, which will be described in more detail below with reference to FIGS. 20 to 22.

A detailed configuration for this will be described in detail with reference to FIGS. 20 to 27.

Figure 20:
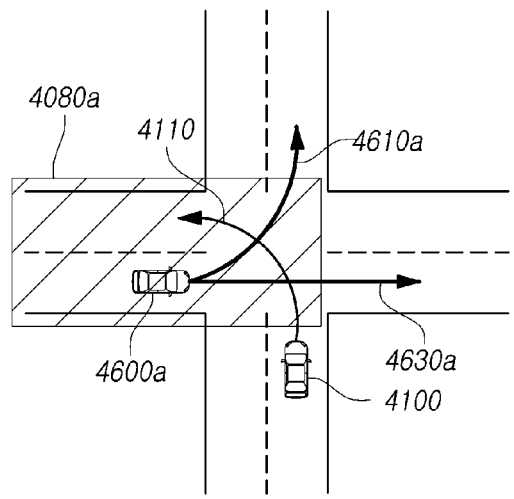
FIGS. 20 to 22 are diagrams illustrating a first example for describing an operation of a setter according to the second embodiment of the present disclosure.
Figure 21:
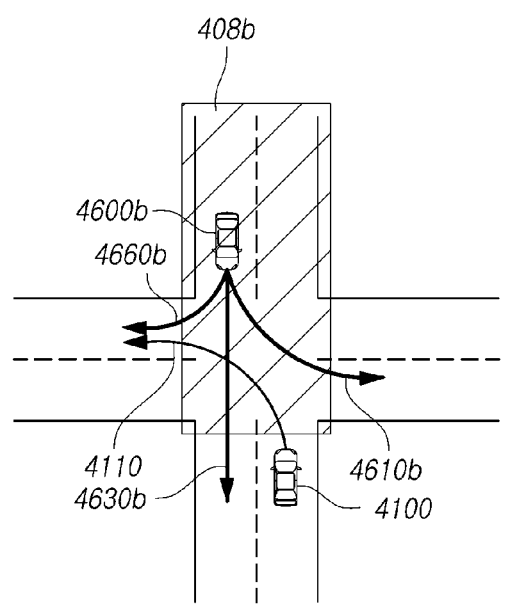
Figure 22:
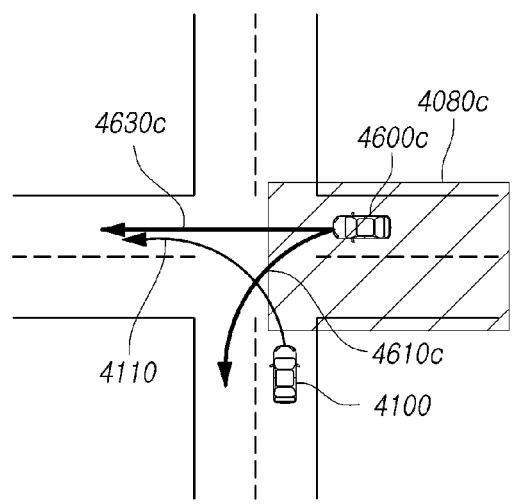
Figure 23:
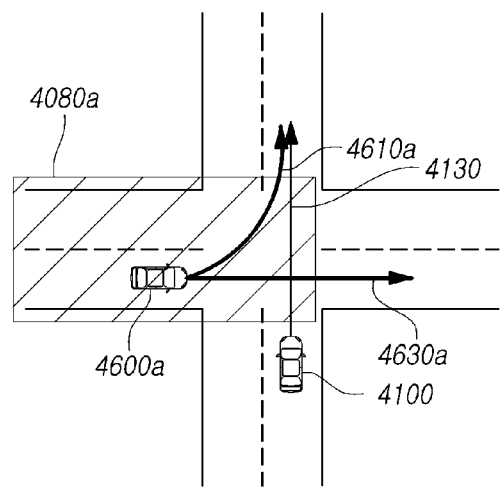
FIGS. 23 to 25 are diagrams illustrating a second example for describing an operation of the setter according to the second embodiment of the present disclosure.
Figure 24:
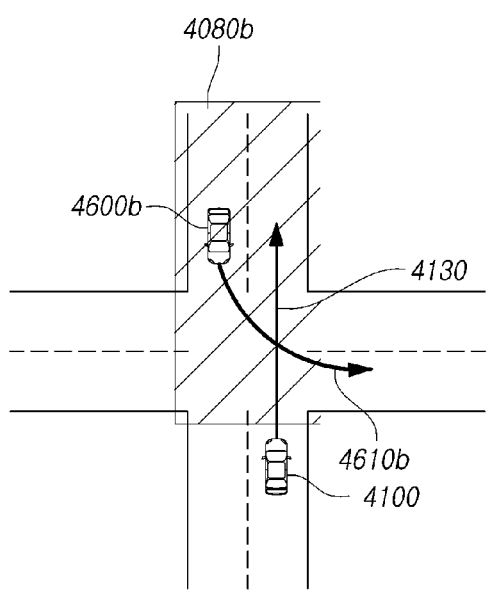
Figure 25:
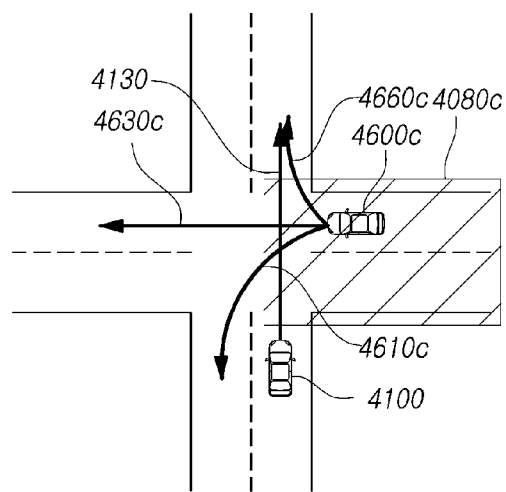
Figure 26:
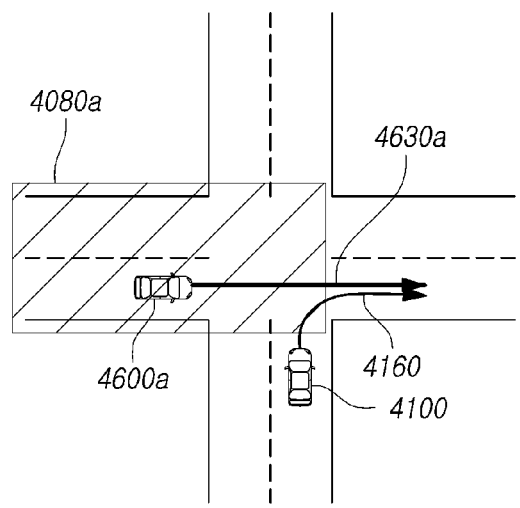
FIGS. 26 to 27 are diagrams illustrating a third example for describing an operation of the setter according to the second embodiment of the present disclosure.
Figure 27:
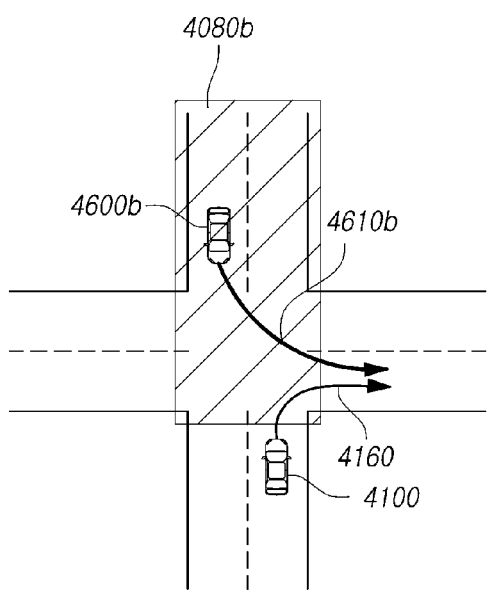

FIGS. 20 to 22 are diagrams illustrating a first example for describing the operation of a setter of the vehicle controller according to the second embodiment of the present disclosure, FIGS. 23 to 25 are diagrams illustrating a second example for describing the operation of a setter of the vehicle control device according to the second embodiment of the present disclosure, and FIGS. 26 to 27 are diagrams illustrating a third example for describing the operation of the setter according to the second embodiment of the present disclosure.

FIG. 20 illustrates a situation that may occur when the vehicle 4100 turns left (4110), FIG. 21 illustrates a situation that may occur when the host vehicle 4100 goes straight forward (4130), and FIG. 22 illustrates a situation that may occur when the host vehicle 4100 turns right (4160).

Referring to FIG. 20, the host vehicle 4100 that turns left (4110) may collide with a first target vehicle 4600a that turns left (4610a) or goes straight forward (4630a) while approaching from the left side.

In this situation, the vehicle information sensing unit may sense the vehicle speed or the gear position corresponding to progressing, and may sense the yaw rate, the steering angle, or the turn signal lamp corresponding to left turn. Thus, the host vehicle path determination unit may determine the path of the host vehicle 4100 as a left turn (4110).

In addition, the target vehicle sensing unit may sense the position of the first target vehicle 4600a based on the second radar information acquired from radars configured to monitor both sides at predetermined time intervals, and based on the sensed position of the first target vehicle 4600a, the target vehicle path determination unit may determine the path of the first target vehicle 4600a as a left turn (4610a) or straight forward (4630a).

Accordingly, the setter may set the left side as a region of interest (4800a).

Referring to FIG. 21, the host vehicle 4100 that turns left (4110) may collide with a second target vehicle 4600b that turns left (4610b), goes straight forward (4630b), or turns right 4660b while approaching from the front side.

In this situation, the vehicle information sensing unit may sense the vehicle speed or the gear position corresponding to progressing, and may sense the yaw rate, the steering angle, or the turn signal lamp corresponding to left turn. Thus, the host vehicle path determination unit may determine the path of the host vehicle 4100 as a left turn (4110).

In addition, the target vehicle sensing unit may sense the position of the second target vehicle 4600b based on the camera image information acquired from a camera configured to monitor the front side and the first radar information acquired from a radar at predetermined time intervals, and based on the position of the sensed second target vehicle 4600b, the target vehicle path determination unit may determine the path of the second target vehicle 4600b as a left turn (4610b), straight forward (4630b), or a right turn (4660b). Here, the target vehicle sensing unit may sense the position of the second vehicle 4600b by the fusion of the camera image information and the first radar information.

Accordingly, the setter may set the front side as a region of interest (4800b).

Referring to FIG. 22, the host vehicle 4100 that turns left (4110) may collide with a third target vehicle 4600c that turns left (4610*c*) or goes straight forward (4630*c*) while approaching from the right side.

In this situation, the vehicle information sensing unit may sense the vehicle speed or the gear position corresponding to progressing, and may sense the yaw rate, the steering angle, or the turn signal lamp corresponding to left turn. Thus, the host vehicle path determination unit may determine the path of the host vehicle 4100 as a left turn (4110).

In addition, the target vehicle sensing unit may sense the position of the third target vehicle 4600*c* based on the second radar information acquired from radars configured to monitor both sides at predetermined time intervals, and based on the position of the third target vehicle 4600*c*, the target vehicle path determination unit may determine the path of the third target vehicle 4600*c* as a left turn (4610*c*) or straight forward (4630*c*).

Accordingly, the setter may set the right side as a region of interest (4800*c*).

Referring to FIG. 23, the host vehicle 4100 that goes straight forward (4130) may collide with a first target vehicle 4600*a* that turns left (4610*a*) or goes straight forward (4630*a*) while approaching from the left side.

In this situation, the vehicle information sensing unit may sense the vehicle speed or the gear position corresponding to progressing, and may sense the yaw rate, the steering angle, or the turn signal lamp corresponding to straight forward. Thus, the host vehicle path determination unit may determine the path of the host vehicle 4100 as straight forward (4130).

In addition, the target vehicle sensing unit may sense the position of the first target vehicle 4600*a* based on the second radar information acquired from radars configured to monitor both sides at predetermined time intervals, and based on the sensed position of the first target vehicle 4600*a*, the target vehicle path determination unit may determine the path of the first target vehicle 4600*a* as a left turn (4610*a*) or straight forward (4630*a*).

Accordingly, the setter may set the left side as a region of interest (4800*a*).

Referring to FIG. 24, the host vehicle 4100 that goes straight forward (4130) may collide with a second target vehicle 4600*b* that turns left (4610*a*) while approaching from the front side.

In this situation, the vehicle information sensing unit may sense the vehicle speed or the gear position corresponding to progressing, and may sense the yaw rate, the steering angle, or the turn signal lamp corresponding to straight forward. Thus, the host vehicle path determination unit may determine the path of the host vehicle 4100 as straight forward (4130).

In addition, the target vehicle sensing unit may sense the position of the second target vehicle 4600*b* based on the camera image information acquired from a camera configured to monitor the front side and the first radar information acquired from a radar at predetermined time intervals, and based on the position of the second target vehicle 4600*b*, the target vehicle path determination unit may determine the path of the second target vehicle 4600*b* as a left turn (4610*b*). Here, the target vehicle sensing unit may sense the position of the second vehicle 4600*b* by the fusion of the camera image information and the first radar information.

Accordingly, the setter may set the front side as a region of interest (4800*b*).

Referring to FIG. 25, the host vehicle 4100 that goes straight forward (4130) may collide with a third target vehicle 4600*c* that turns left (4610*c*), goes straight forward (4630*c*), or turns right (4660*c*) while approaching from the front side.

In this situation, the vehicle information sensing unit may sense the vehicle speed or the gear position corresponding to progressing, and may sense the yaw rate, the steering angle, or the turn signal lamp corresponding to straight forward. Thus, the host vehicle path determination unit may determine the path of the host vehicle 4100 as straight forward (4130).

In addition, the target vehicle sensing unit may sense the position of the third target vehicle 4600*c* based on the second radar information acquired from radars configured to monitor both lateral sides at predetermined time intervals, and based on the sensed position of the third target vehicle 4600*c*, the target vehicle path determination unit may determine the path of the third target vehicle 4600*c* as a left turn (4610*c*), straight forward (4630*c*), or right turn (4660*c*).

Accordingly, the setter may set the right side as a region of interest (4800*c*).

Referring to FIG. 26, the host vehicle 4100 that turns right (4160) may collide with a first target vehicle 4600*a* that goes straight forward (4630*a*) while approaching from the left side.

In this situation, the vehicle information sensing unit may sense the vehicle speed or the gear position corresponding to progressing, and may sense the yaw rate, the steering angle, or the turn signal lamp corresponding to right turn. Thus, the host vehicle path determination unit may determine the path of the host vehicle 4100 as a right turn (4160).

In addition, the target vehicle sensing unit may sense the position of the first target vehicle 4600*a* based on the second radar information acquired from radars configured to monitor both sides at predetermined time intervals, and based on the sensed position of the first target vehicle 4600*a*, the target vehicle path determination unit may determine the path of the first target vehicle 4600*a* as straight forward (4630*a*).

Accordingly, the setter may set the left side as a region of interest (4800*a*).

Referring to FIG. 27, the host vehicle 4100 that turns right (4160) may collide with a second target vehicle 4600*a* that turns left (4610*a*) while approaching from the front side.

In this situation, the vehicle information sensing unit may sense the vehicle speed or the gear position corresponding to progressing, and may sense the yaw rate, the steering angle, or the turn signal lamp corresponding to a right turn. Thus, the host vehicle path determination unit may determine the path of the host vehicle 4100 as a right turn (4160).

In addition, the target vehicle sensing unit may sense the position of the second target vehicle 4600*b* based on the camera image information acquired from a camera configured to monitor the front side and the first radar information at predetermined time intervals, and based on the position of the second target vehicle 4600*b*, the target vehicle path determination unit may determine the path of the second target vehicle 4600*b* as a left turn (4610*b*). Here, the target vehicle sensing unit may sense the position of the second vehicle 4600*b* by the fusion of the camera image information and the first radar information.

Accordingly, the setter may set the front side as a region of interest (4800*b*).

Each of FIGS. 20 to 27 illustrates a situation in which one target vehicle exists for the convenience of understanding. However, without being limited thereto, two or more target vehicles may exist. That is, when at least two target vehicles exist in FIGS. 20 to 22, when at least two target vehicles exist in FIGS. 23 to 25, and when a target vehicle exists in FIGS. 26 and 27, a region in which the corresponding vehicles are positioned may be set as a region of interest. The setter operating as described above with reference to FIGS. 20 to 27 may operate as described below with reference to FIG. 28.

Figure 28:
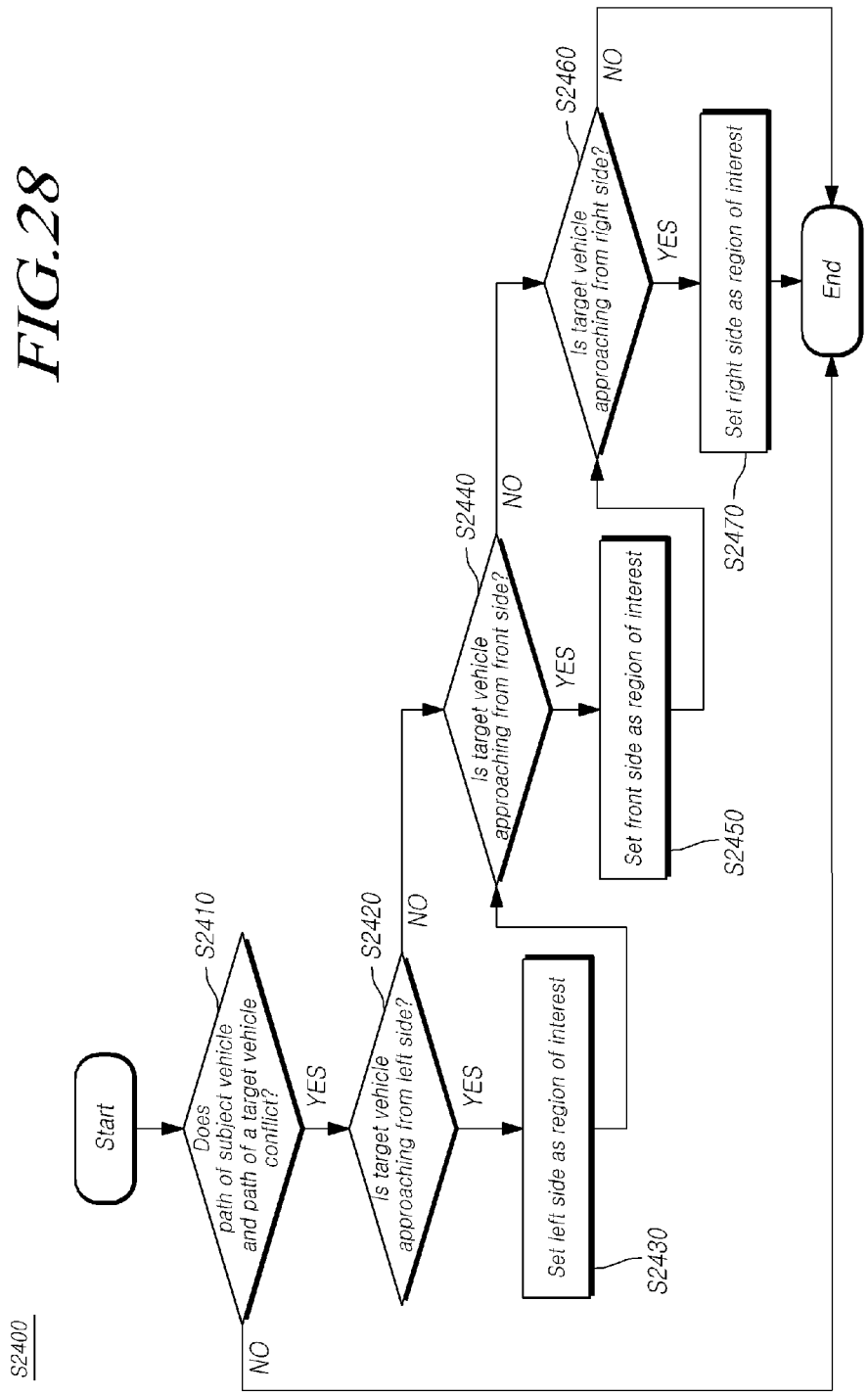
FIG. 28 is a diagram illustrating a fourth example for describing an operation of the setter according to the second embodiment of the present disclosure.

FIG. 28 is a diagram illustrating a fourth example for describing an operation of the setter according to one embodiment of the present disclosure.

Referring to FIG. 28, the setter determines whether the path of the host vehicle and the path of a target vehicle conflict (S2410). This may be determined based on the path of the host vehicle determined by the host vehicle path determination unit and the path of the target vehicle determined by the target vehicle path determination unit.

When it is determined in step S2410 that the path of the host vehicle and the path of the target vehicle conflict (YES), the setter determines whether the target vehicle is approaching from the left side (S2420). This may be determined based on the position of the target vehicle sensed by the target vehicle sensing unit.

When it is determined in step S2420 that the target vehicle is approaching from the left side (YES), the setter may set the left side as a region of interest (S2430).

Alternatively, when it is determined in step S2420 that the target vehicle is not approaching from the left side (NO), or when step S2430 is performed, the setter determines whether the target vehicle approaches from the front side (S2440). This may be determined based on the position of the target vehicle sensed by the target vehicle sensing unit.

When it is determined in step S2440 that the target vehicle is approaching from the front side (YES), the setter may set the front side as a region of interest (S2450).

Alternatively, when it is determined in step S2440 that the target vehicle is not approaching from the front side (NO), or when step S2450 is performed, the setter determines whether the target vehicle approaches from the right side (S2460). This may be determined based on the position of the target vehicle sensed by the target vehicle sensing unit.

When it is determined in step S2460 that the target vehicle is approaching from the right side (YES), the setter may set the right side as a region of interest.

When the region of interest is set as described with reference to FIGS. 20 to 27, the calculator calculates the speed of a vehicle of interest which is the target vehicle positioned within the region of interest set in step S2400, and calculates a TTC with the vehicle of interest using the calculated speed of the vehicle of interest (S2500).

For example, in step S2200, it is possible to sense the target vehicle at a predetermined time interval. The calculator 1600 may calculate the speed of the vehicle of interest, which is the target vehicle positioned within the region of interest set in step S2400, using the moving distance of the vehicle of interest according to a positional change of the vehicle of interest, and the predetermined time.

For example, the calculator may divide the calculated speed of the vehicle of interest into those for two axes (which are composed of a first axis and a second axis, and the first axis is the same as the speed axis of the host vehicle), and the TTC may be calculated using an equivalent velocity formula (Equation 3 below) for each of the first axis and the second axis.

$$v = v_0 + a*t$$

$$s = v_0 + (1/2)*a*t^2$$

$$v_1^2 - v_0^2 = -2*a*s \qquad \text{Equation 3}$$

V denotes speed, $v_0$ denotes initial speed, a denotes acceleration, t denotes time, and s denotes a moving distance.

In another example, the calculator may calculate a TTC using the point that the calculated speed of the vehicle of interest and the distance to the second axis has a right-angled triangle relationship.

The above example is a method of calculating a TTC in a vehicle of interest moving at a constant acceleration, and the other example is a method of calculating a TTC in a vehicle of interest moving at a constant speed. This is a known method in dynamics, and the detailed description is omitted because the detailed description of the method may make the point in describing the operation of the present disclosure unclear.

On the other hand, when two or more regions of interest are set in step S2400, the calculator may calculate a TTC with two or more vehicles of interest corresponding to two or more regions of interest.

When the calculator calculates the speed of the vehicle of interest and the TTC with the vehicle of interest as described above, and the controller controls the notification device to provide a notification when the TTC with the vehicle of interest calculated in step S2500 is smaller than a preset first time, the controller may control the brake to decelerate when the TTC is smaller than a second time (S2600).

The first time and the second time may be expressed by the following Equation 4.

$$\text{First Time [s]} > \text{Second Time [s]} \qquad \text{Equation 4}$$

On the other hand, when two or more regions of interest are set in step S2400 and a TTC with two or more vehicles of interest corresponding to the two or more regions of interest set in step S2500 is calculated, the controller controls the notification device to provide a notification when the minimum time among two or more TTCs calculated in step S2500 is smaller than the preset first time, and the controller may control the control device to decelerate when the minimum time is smaller than the second time (S2600).

According to the vehicle control device according to the second embodiment of the present disclosure that operates as illustrated in FIG. 28, it is possible to prevent the risk of collision by controlling the notification device or the control device based on a relationship between the host vehicle and a vehicle of interest that is at risk of collision with the host vehicle among the target vehicles based on the path of the host vehicle and the paths of target vehicles.

This may solve the problem that the notification device or the control device operates even though there is no risk of collision according to the path of the target vehicle, which problem is present in the existing intersection collision avoidance system that controls the host vehicle based on the TTC with the target vehicle irrespective of the path of the host vehicle and the path of the target vehicle.

Meanwhile, the vehicle information sensing unit used in the vehicle control device 1000 according to the second embodiment as described above may include sensors or vehicle components such as a vehicle speed sensor, a gear position sensor, a yaw rate sensor, a steering angle sensor, and/or a turn signal lamp.

In addition, the target vehicle sensing unit 1300 may include a camera (e.g., image sensor), at least one radar sensor, and the like as described above.

In addition, the host vehicle path determination unit 1200, the target vehicle path determination unit 1400, the setter 1500, the calculator 1600, and the controller 1700 may be implemented as some modules of an integrated control device or an ECU installed in the vehicle.

The integrated control device or ECU of such a vehicle may include a storage device, such as a processor and a memory, a computer program capable of being executed by a processor (e.g., computer, etc.) to perform a specific function, and the like. The target vehicle path determination unit 1400, the setter 1500, the calculator 1600, the controller 1700, and the like may be implemented as software modules capable of performing respective intrinsic functions thereof.

As described above, according to the present disclosure, it is possible to predict a progress path of an object through a progress path scenario and to determine a possibility of collision between the object and the host vehicle according to the predicted path, so that the reliability of determination can be enhanced as compared with the conventional technique of determining a possibility of collision merely based on a proximity degree between the object and the host vehicle. In addition, according to the present disclosure, when a plurality of objects are sensed, an object having a high possibility of collision may be determined, and collision avoidance control may be appropriately performed with respect to the object having a high possibility of collision.

According to another embodiment of the present disclosure, it is possible to improve performance of sensing target vehicles, and as a result, to reduce the likelihood of an accident at the intersection by variably setting a region of interest of a sensing sensor of the host vehicle according to the relationship between the progress paths of the host vehicle and target vehicles at an intersection.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A device for controlling a host vehicle in an intersection area, the device comprising:
   a sensor configured to sense positions of a plurality of objects in the intersection area; and
   a controller configured to:
   track progress paths of the plurality of objects based on the sensed positions; and
   store a plurality of progress path scenarios for the plurality of objects and apply at least one progress path scenario among the plurality of progress path scenarios based on the tracked progress paths,
   wherein the controller is configured to determine a possibility of collision between each of the plurality of objects and the host vehicle in the intersection area according to the applied at least one progress path scenario, and to display a determined possibility of collision or to control the host vehicle according to the determined possibility of collision.

2. The device of claim 1, wherein the sensor includes a front radar sensor, a corner radar sensor, and an image sensor, and the controller is configured to track the objects by sequentially using information sensed by the corner radar sensor, information sensed by the front radar sensor, and information sensed by the image sensor.

3. The device of claim 1, wherein the controller is configured to select N objects (N is a natural number of 2 or more) among the objects sensed by the sensor, and to track progress paths for only the selected N objects.

4. The device of claim 3, wherein the controller is configured to exclude objects moving away from the host vehicle or objects not having the possibility of collision from the progress paths, and to further track as many objects located in a higher priority area as a number of the excluded objects.

5. The device of claim 1, wherein the controller is configured to determine a Time-To-Collision (TTC) for a first object and a second object, and when the collision probability of the progress path scenario applied to the first object is higher than the collision probability of the progress path scenario applied to the second object, the controller displays the determined TTC for the first object or controls the host vehicle according to the TTC determined for the first object, and
   the progress path scenario applied to the first object in the intersection area is a progress path scenario in which a progress path of the first object intersects with a progress path of the host vehicle, and the progress path scenario applied to the second object is a progress path scenario in which a progress path of the second object does not intersect with the progress path of the host vehicle.

6. A device for controlling a host vehicle in an intersection area, the device comprising:
   a vehicle information sensor configured to sense host vehicle information which is at least one of a vehicle speed, a gear position, a yaw rate, a steering angle, or a turn signal lamp;
   a target vehicle sensor configured to sense a target vehicle based on external information which is at least one of: image information acquired from an image sensor configured to monitor a front side of the host vehicle; first radar information acquired from a front radar configured to monitor the front side; or second radar information acquired from corner radars configured to monitor both corner sides of the host vehicle; and
   a controller configured to:
   determine a path of the target vehicle in the intersection area based on the external information;
   determine a path of a host vehicle in the intersection area based on the host vehicle information;
   set a monitoring range based on the path of the host vehicle and the path of the target vehicle in the intersection area such that the monitoring range includes a position of the target vehicle when the path of the host vehicle overlaps the path of the target vehicle; and determine a speed of the target vehicle positioned in the monitoring range based on the external information and to determine a Time-To-Collision (TTC) with the target vehicle, wherein the controller is configured to control a notification device or a control device based on the TTC with the target vehicle.

7. The device of claim 6, wherein the target vehicle sensor is configured to track an object by sequentially using the second radar information, the first radar information, and the image information.

8. The device of claim 6, wherein the controller is configured to control the notification device to provide a notification when the TTC with the target vehicle is smaller than a preset first time and to control the control device to decelerate the host vehicle when the TTC with the target vehicle is less than a preset second time, and the preset first time is longer than the preset second time.

9. The device of claim 6, wherein the controller is configured to set two or more regions of interest, and when the controller determines two or more TTCs, the controller is configured to control the notification device to provide a notification when a minimum TTC among the two or more TTCs is less than a preset first time and to control the control device to decelerate the host vehicle when the minimum TTC is less than a preset second time, and the preset first time is longer than the preset second time.

10. A device for controlling a host vehicle in an intersection area, the device comprising:

a host vehicle sensor configured to sense host vehicle information;

a target vehicle sensor configured to sense target vehicle information; and a controller configured to control the host vehicle based on the host vehicle information and target vehicle information, wherein the controller sets a monitoring range which includes the target vehicle at a position when a path of the target vehicle intersects a path of the host vehicle and controls the host vehicle in response to a determination that a collision between the host vehicle and target vehicle in the monitoring range will occur in a specified time period.

11. The device of claim 10, wherein the controller controls the host vehicle by issuing a notification if the specified time period is greater than a predetermined value.

12. The device of claim 10, wherein the controller controls the host vehicle by controlling movement of the host vehicle if the specified time period is smaller than a predetermined value.

13. The device of claim 10, wherein the controller controls the host vehicle by issuing a notification if the specified time period is greater than the predetermined value.

14. The device of claim 10, wherein the host vehicle information includes at least one of a vehicle speed, a gear position, a yaw rate, a steering angle, or a turn signal lamp.

15. The device of claim 10, wherein the target vehicle information includes external information based on at least one of: camera image information acquired from a camera configured to monitor a front side of the host vehicle, first radar information acquired from a front radar configured to monitor the front side, or second radar information acquired from a corner radar configured to monitor both corner sides of the host vehicle.

16. A method for controlling a host vehicle in an intersection area, the method comprising:

sensing, via a host vehicle sensor, host vehicle information;

sensing, via a target vehicle sensor, target vehicle information; and controlling the host vehicle based on the host vehicle information and target vehicle information, wherein the controlling step includes setting a monitoring range which includes the target vehicle at a position when a path of the target vehicle intersects a path of the host vehicle and controlling the host vehicle in response to a determination that a collision between the host vehicle and target vehicle in the monitoring range will occur in a specified time period.

17. The method of claim 16, wherein the controlling step includes controlling the host vehicle by issuing a notification if the specified time period is greater than a predetermined value.

18. The method of claim 16, wherein the controlling step includes controlling the host vehicle by controlling movement of the host vehicle if the specified time period is smaller than a predetermined value.

19. The method of claim 18, wherein the controlling step includes controlling the host vehicle by issuing a notification if the specified time period is greater than the predetermined value.

20. The method of claim 16, wherein the host vehicle information includes at least one of a vehicle speed, a gear position, a yaw rate, a steering angle, or a turn signal lamp.

21. The method of claim 16, wherein the target vehicle information includes external information based on at least one of: camera image information acquired from a camera configured to monitor a front side of the host vehicle, first radar information acquired from a front radar configured to monitor the front side, or second radar information acquired from a corner radar configured to monitor both corner sides of the host vehicle.

* * * * *